INVENTOR.
GERHARD O.K. SCHNEIDER
BY F. H. Henson
ATTORNEY

Feb. 2, 1960 G. O. K. SCHNEIDER 2,923,777

QUEUE STORE CIRCUIT

Filed April 18, 1958 17 Sheets-Sheet 2

Feb. 2, 1960 G. Q. K. SCHNEIDER 2,923,777

QUEUE STORE CIRCUIT

Filed April 18, 1958 17 Sheets-Sheet 4

PULSE CHART

Feb. 2, 1960 G. O. K. SCHNEIDER 2,923,777

QUEUE STORE CIRCUIT

Filed April 18, 1958 17 Sheets-Sheet 6

HYBRID CIRCUITS

Feb. 2, 1960 G. O. K. SCHNEIDER 2,923,777

QUEUE STORE CIRCUIT

Filed April 18, 1958 17 Sheets-Sheet 9

Feb. 2, 1960 G. O. K. SCHNEIDER 2,923,777

QUEUE STORE CIRCUIT

Filed April 18, 1958 17 Sheets-Sheet 14

Feb. 2, 1960 G. O. K. SCHNEIDER 2,923,777

QUEUE STORE CIRCUIT

Filed April 18, 1958 17 Sheets-Sheet 16

QUEUE STORE DISTRIBUTOR (1,2, OR R.O.)

NOTE. MK(+) USED FOR READOUT DISTRIBUTOR
MK(-) USED FOR DISTRIBUTOR 1 & 2

2,923,777

QUEUE STORE CIRCUIT

Gerhard O. K. Schneider, Rochester, N.Y., assignor to General Dynamics Corporation, Rochester, N.Y., a corporation of Delaware Application April 18, 1958, Serial No. 729,279

18 Claims. (Cl. 179—27)

This invention relates in general to queue store circuits and, more particularly, to queue store circuits for use in electronic switching telephone systems.

In telephone offices comprising one or more attendants' positions, the link circuits, which are utilized to extend connections from the automatic switching equipment in the office to the attendants' positions, conventionally have a lamp appearance at each attendant's position. During busy periods, there may be undue delay in answering a call incoming on a particular link circuit since the attendants have no way of determining in what order calls were initiated. Since the incoming lamps of all unanswered link circuits are illuminated and since newly initiated calls may appear as fast, or faster, than the attendants can answer previously initiated calls, it may happen that calls on some link circuits may remain unanswered indefinitely.

Queue store circuits, comprising electromechanical relays and switches, for controlling the answering of incoming calls to an attendant's position in the same order that the calls are placed are known in the prior art. In recent years, several electronic switching telephone systems have been proposed to overcome the inherent limitations of slowness, physical size, and maintenance problems of the electromechanical devices comprising present day automatic telephone systems but, to my knowledge, none of these electronic switching systems provide the queue store feature.

Accordingly, it is the general object of this invention to provide a new and improved queue store circuit which comprises no electromechanical devices.

It is a more particular object of this invention to provide a new and improved queue store circuit for use as a component of an electronic switching telephone system.

The attendants' equipment and the queue store circuit herein disclosed are also shown and described as a part of the electronic switching telephone system disclosed in copending application Serial No. 729,351, filed April 18, 1958, and assigned to the same assignee as the present invention, now Patent No. 2,897,283. As fully described in the aforementioned copending application, the line terminating units, the incoming registers, and the attendants' link circuits are interconnected by transmission highway networks of the time division channel type. Each of the line terminating units, each of the incoming registers, and each of the link circuits comprises a channel identifying storage circuit and the storage circuits are interconnected by a control network. When an idle link circuit is selected by a route selector under control of the assigned incoming register for the purpose of extending a call to the attendant's cabinet, the incoming register serves to apply marking signals corresponding to the transmission network and the channel within that network to which the calling line terminating unit is connected. This information is read into the channel identification storage circuit in the selected link circuit and the link circuit is thereby controlled to seize the channel assigned to the calling line terminating unit and thus complete a connection between the calling line terminating unit and the selected link circuit.

The queue store circuit provided in the system comprises a plurality of storage positions, fewer in number than the link circuits, and each storage position comprises a plurality of storage elements, which may be transistor flip-flop circuits, individually corresponding to each of the link circuits. A seize conductor is provided for each link circuit of the system and when a connection is completed to a particular link circuit, a seize signal is applied to the seize conductor corresponding to that link circuit. The storage operation of the queue store circuit is controlled by first, second, and read out distributors. The first distributor serves to transmit a first mark signal to all of the storage elements in a storage position on a storage position at a time basis. The second distributor is controlled to search over the seize conductors in a predetermined order and to terminate its searching operation and transmit a second mark signal to all of the storage elements corresponding to a particular link circuit when a seize signal is detected on the seize conductor corresponding to that link circuit.

When a first mark signal and a second mark signal are simultaneously received by a particular storage element, that storage element is activated to thereby store the identity of its corresponding link circuit in the storage position marked by the first distributor. When any one of the storage elements in a storage position is triggered to its activated condition, the first distributor is controlled to advance and mark the next succeeding storage position. Also, when any one of the storage elements corresponding to a particular link circuit is triggered to its activated condition, the application of a seize signal to the seize conductor for that link circuit is terminated and the second distributor is thereby controlled to resume its searching operation. Thus, the identities of link circuits having connections completed thereto are stored in successive storage positions in the same order in which connections are completed to those link circuits.

The read out distributor provided in the system serves to transmit a read out signal to the storage elements in each storage position on a storage position at a time basis. The activated storage stage in each storage position is responsive to the receipt of a read out signal to enable its corresponding link circuit for seizure by the attendants' position circuits and to illuminate the lamp corresponding to that link circuit at each attendant's position. When the call is answered at one of the attendants' positions, the activated storage element corresponding to the answered link circuit is triggered to its inactive condition and the read out distributor is controlled to advance to and mark the next succeeding storage position. Thus, only the incoming lamps corresponding to a single link circuit are illuminated at any given time and the calls are answered in the exact same order as connections are completed to the link circuits.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise fifteen figures on seventeen sheets.

Fig. 1 shows the trunking diagram of a telephone system in which the invention may be embodied.

Figs. 2A, 2B, and 2C, when arranged as shown in Fig. 3B, show a long distance switching center in block diagram form.

Figure 3A:
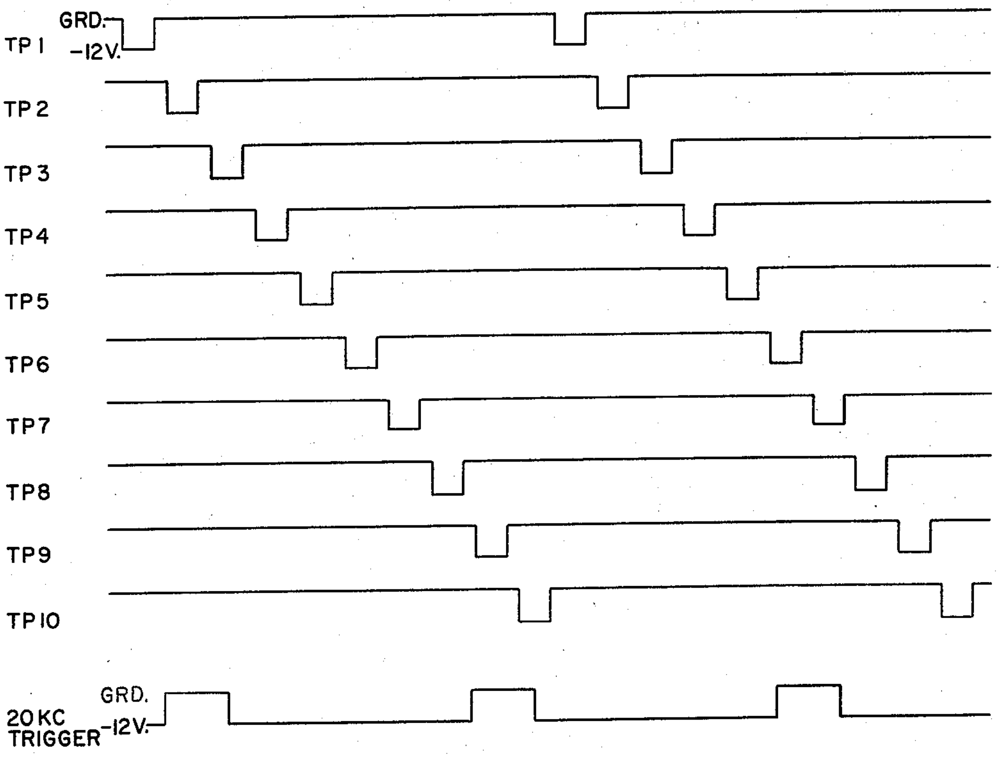
Fig. 3A is a pulse chart of control pulses used in the disclosed system.
Figure 3B:
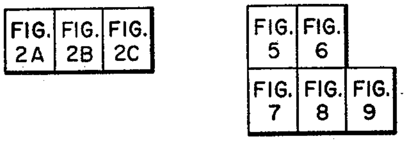

Figs. 5–9, when arranged as shown in Fig. 3B, show circuit details of an attendant's link circuit.

Figure 10:
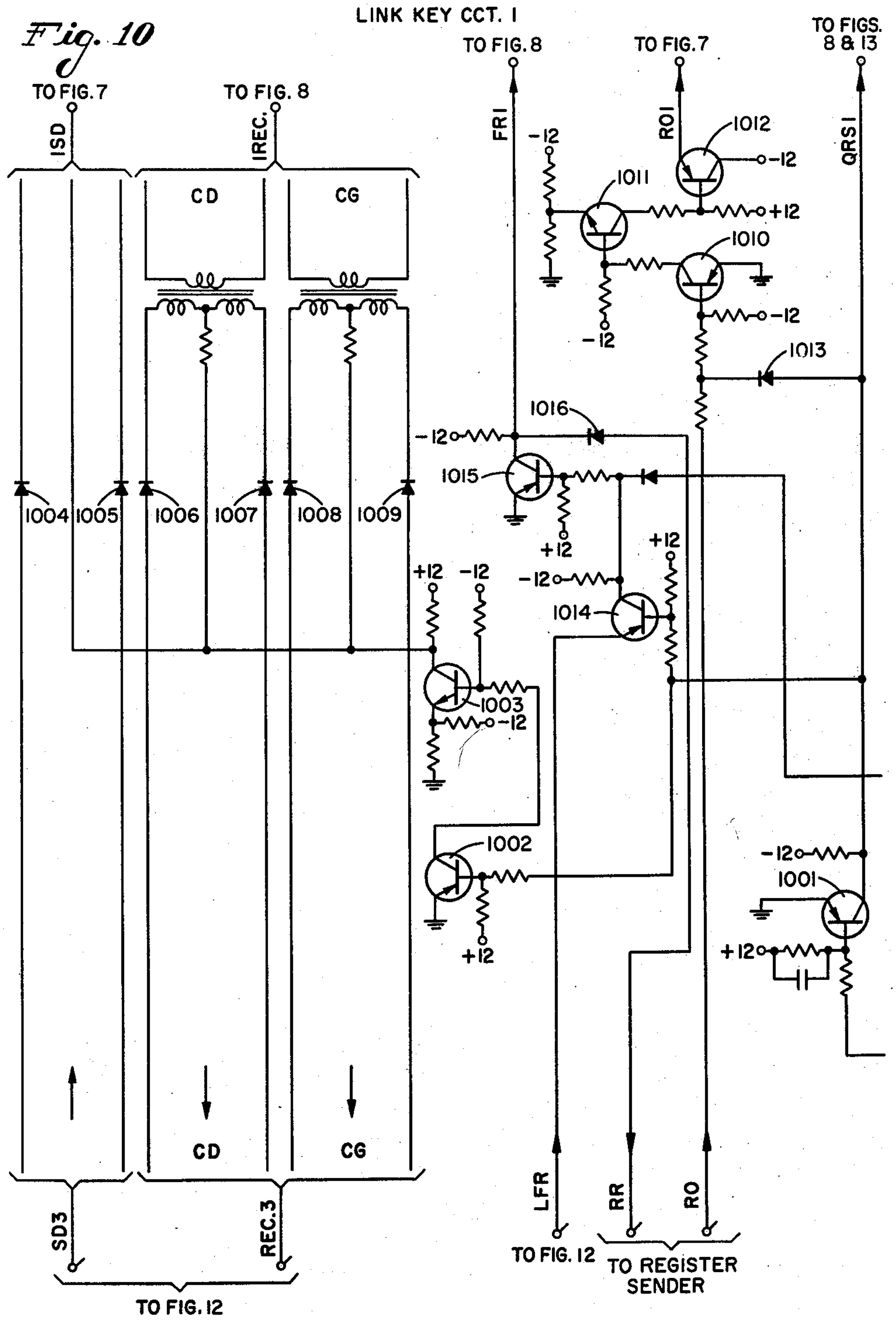
Figure 11:
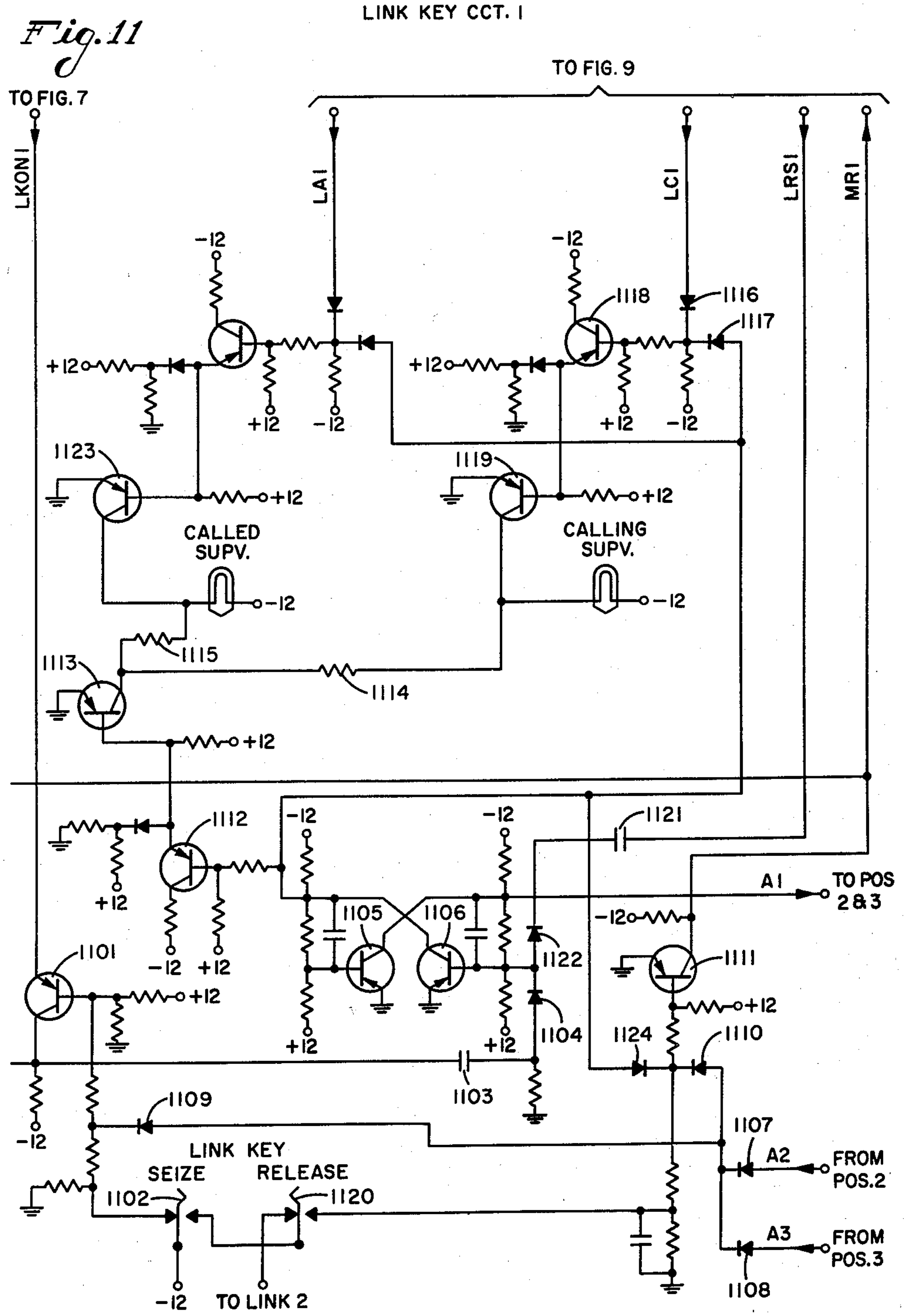

Figs. 10 and 11, when arranged with Fig. 11 to the right of Fig. 10, show circuit details of a link key circuit.

Figure 12:
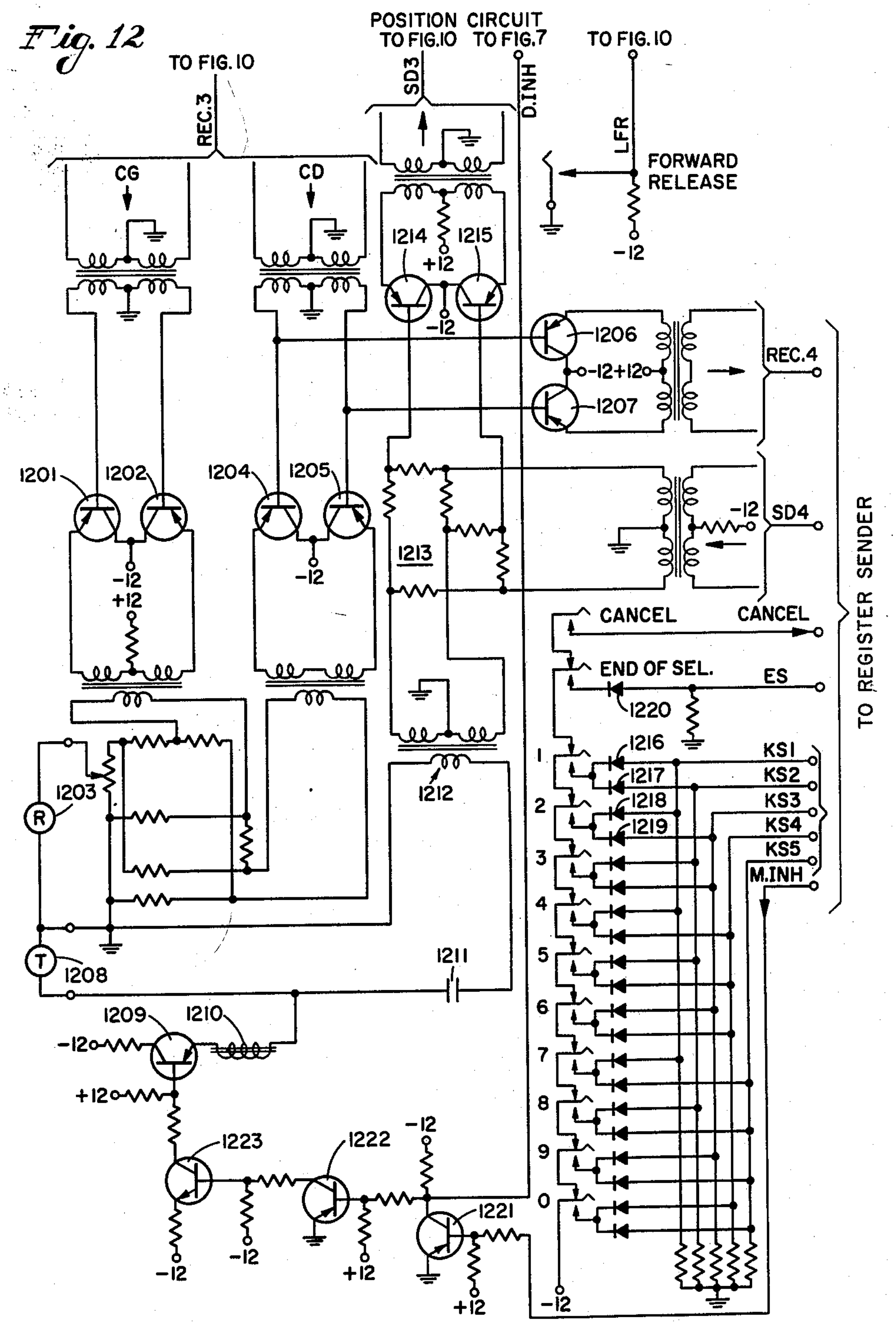

Fig. 12 shows circuit details of an attendant's position circuit.

Figure 13:
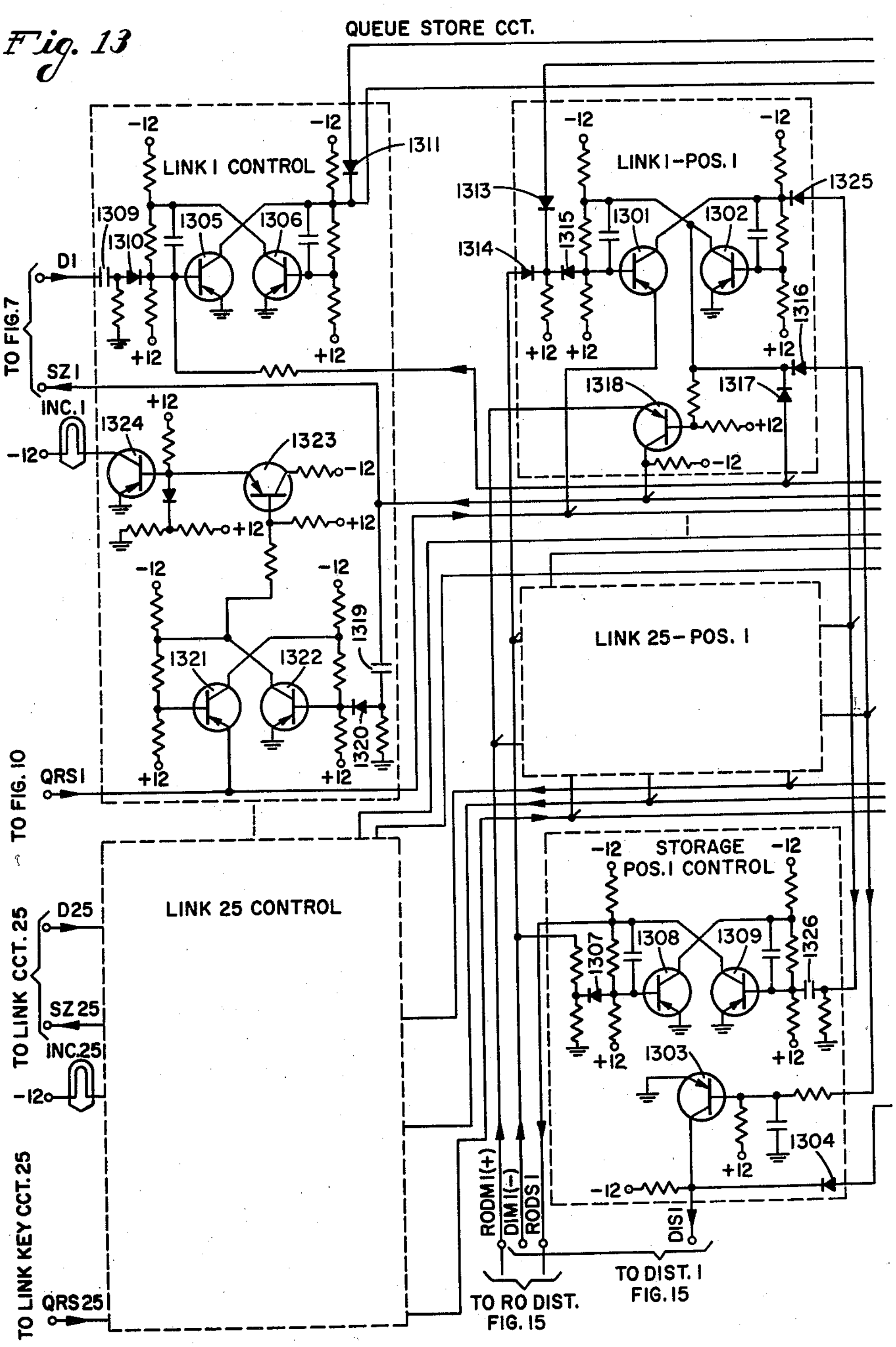
Figure 14:
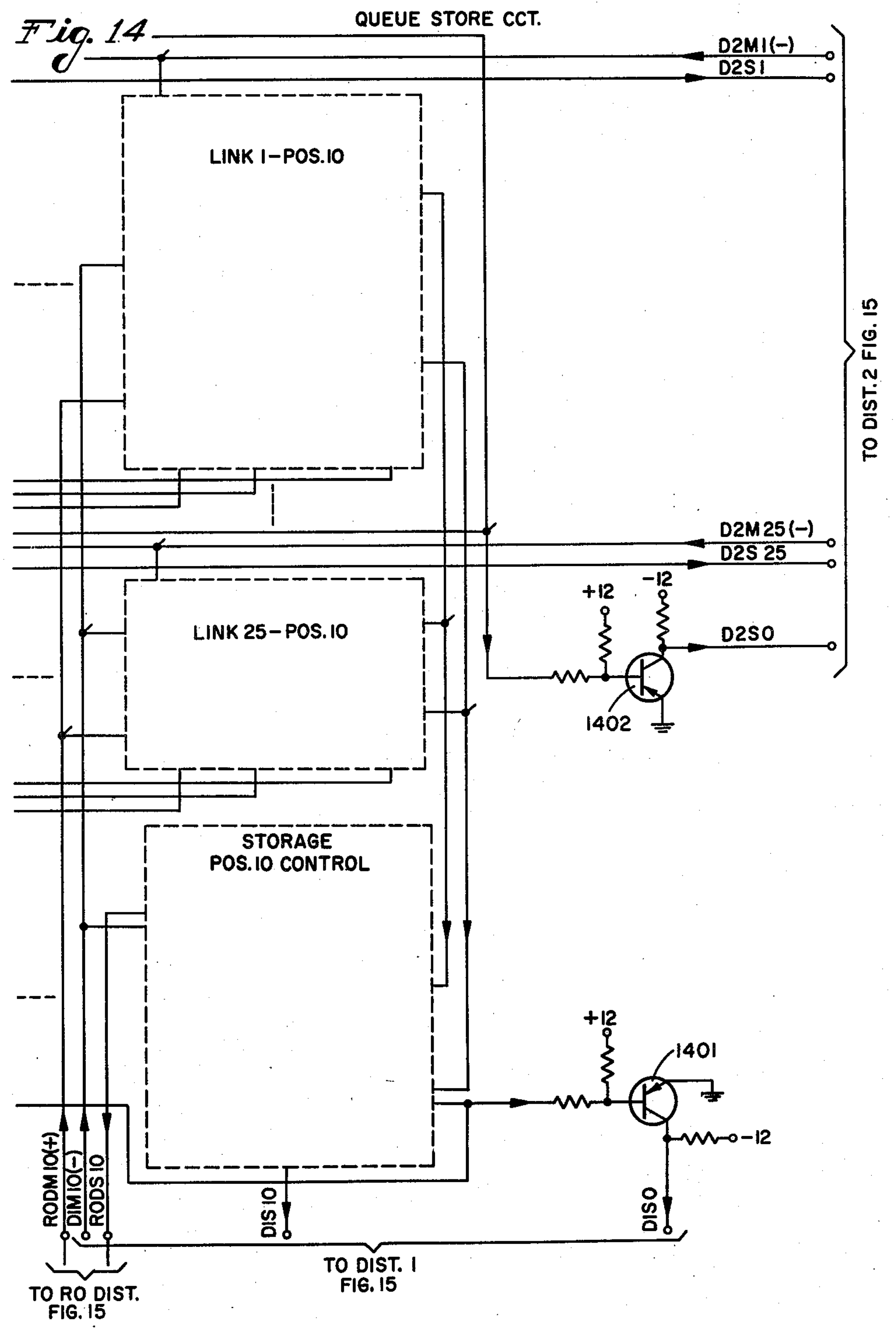

Figs. 13 and 14, when arranged with Fig. 14 to the right of Fig. 13, show circuit details of a queue store circuit.

Figure 15:
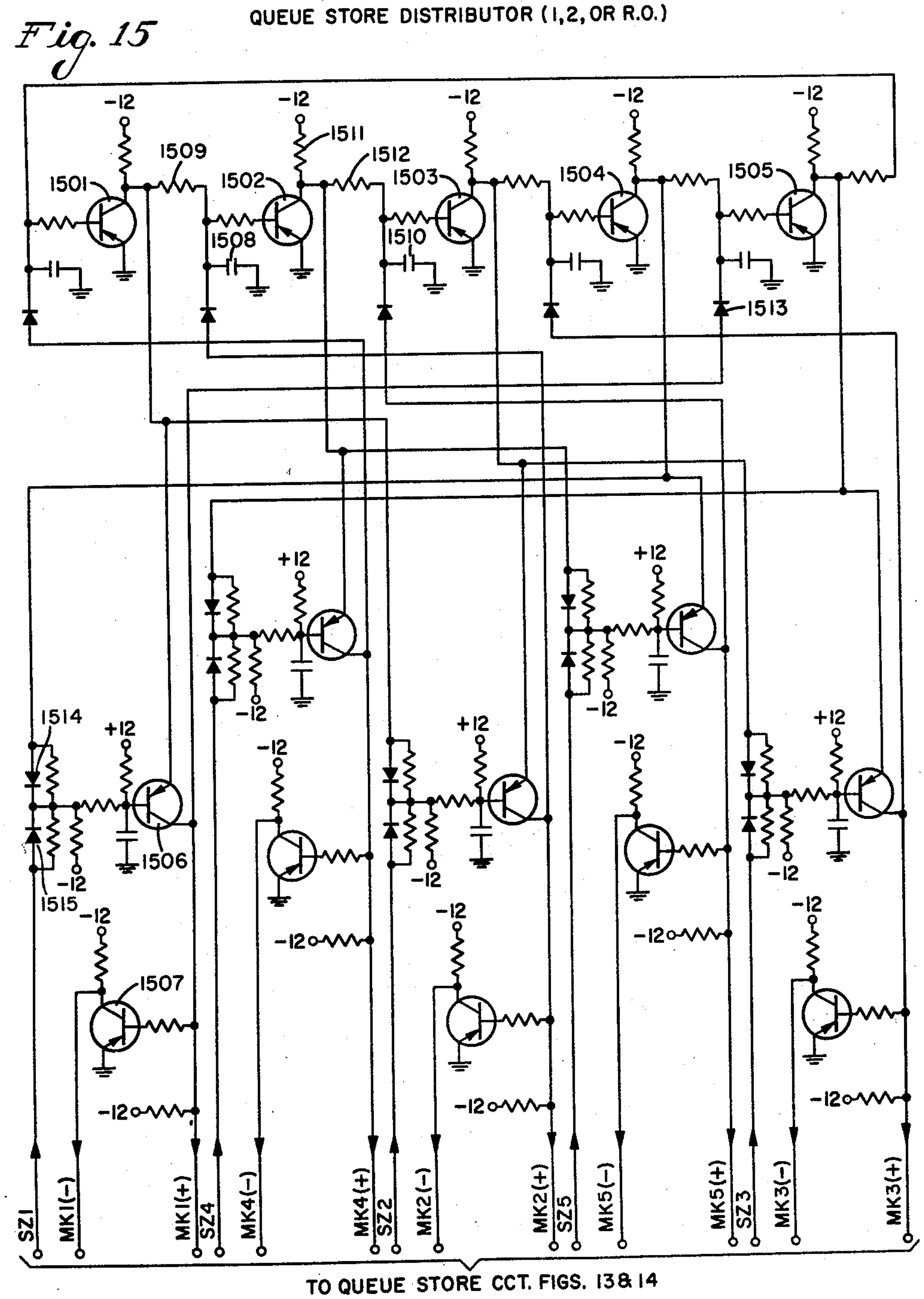

Fig. 15 shows details of a queue store circuit distributor.

Figure 1:
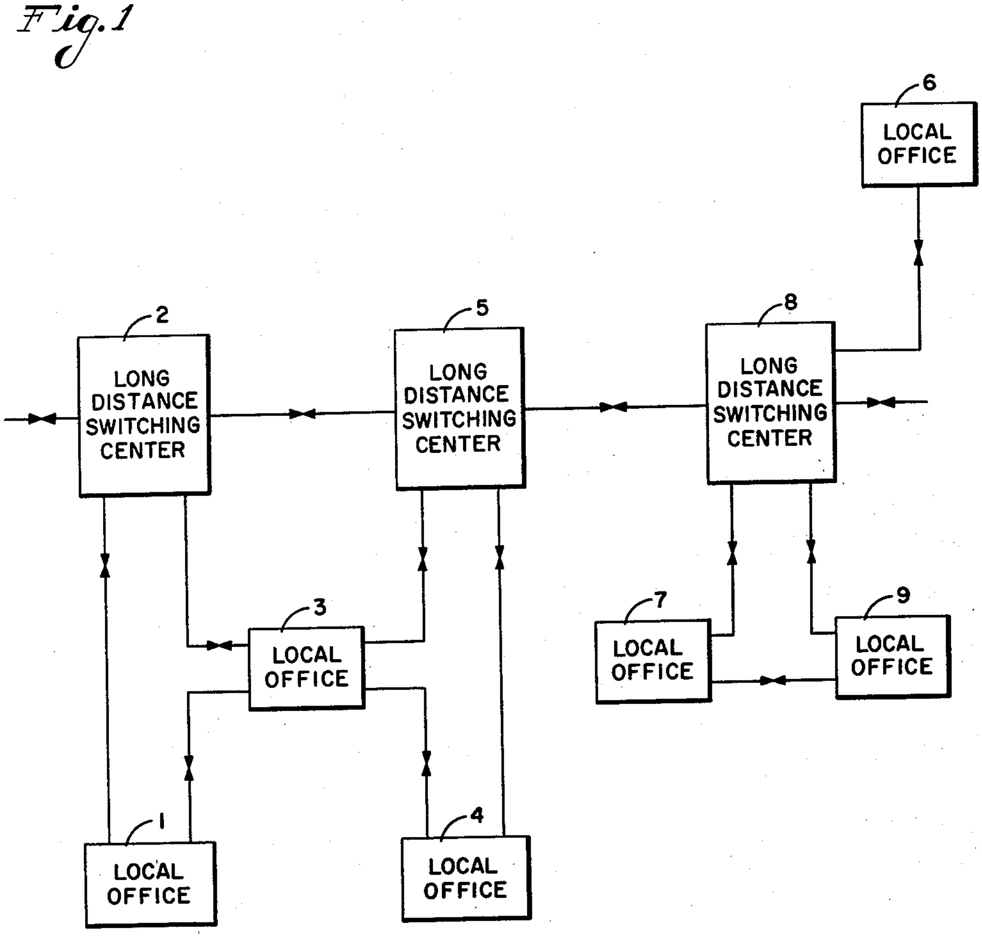
Figure 2A:
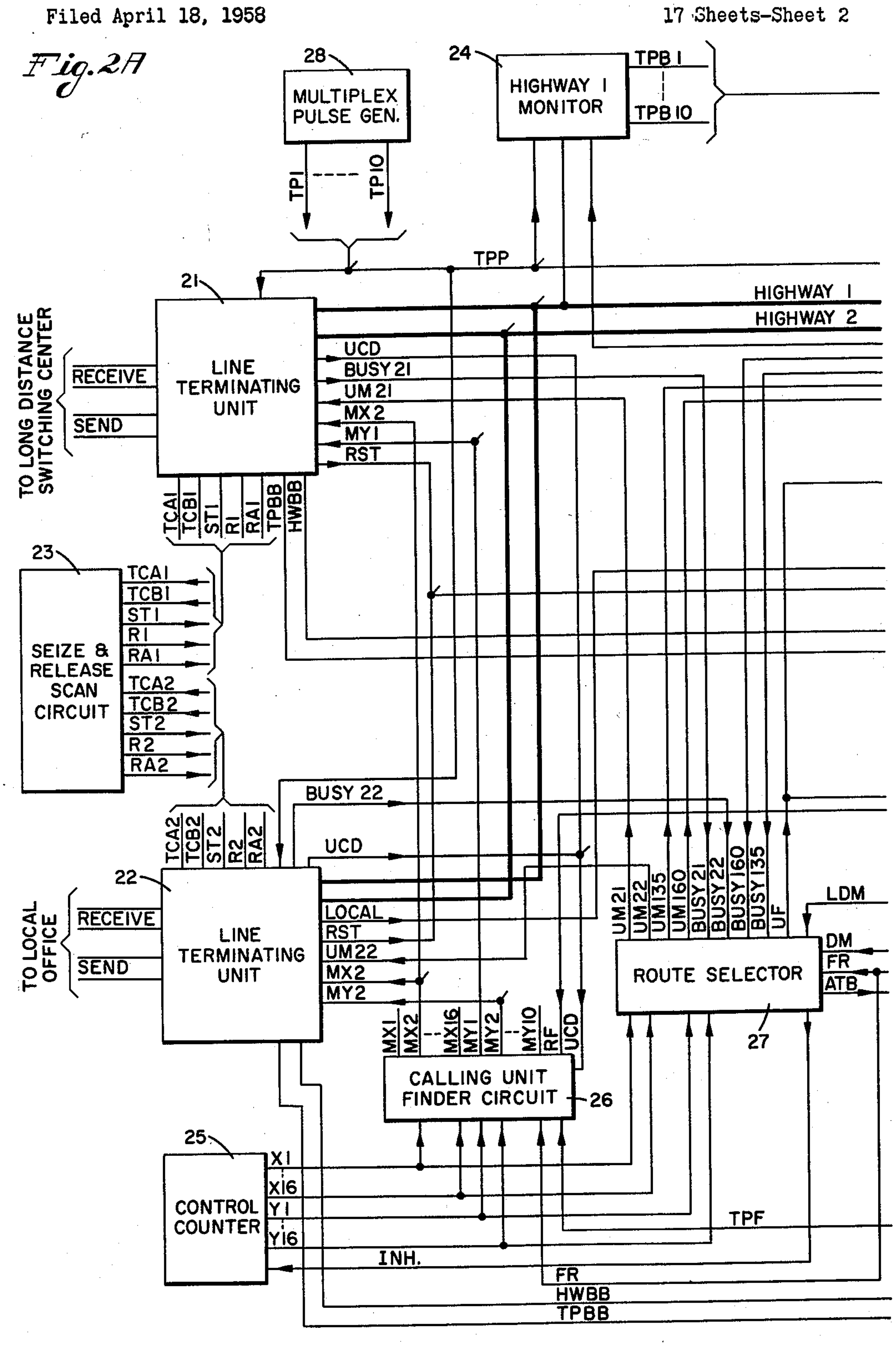
Figure 2B:
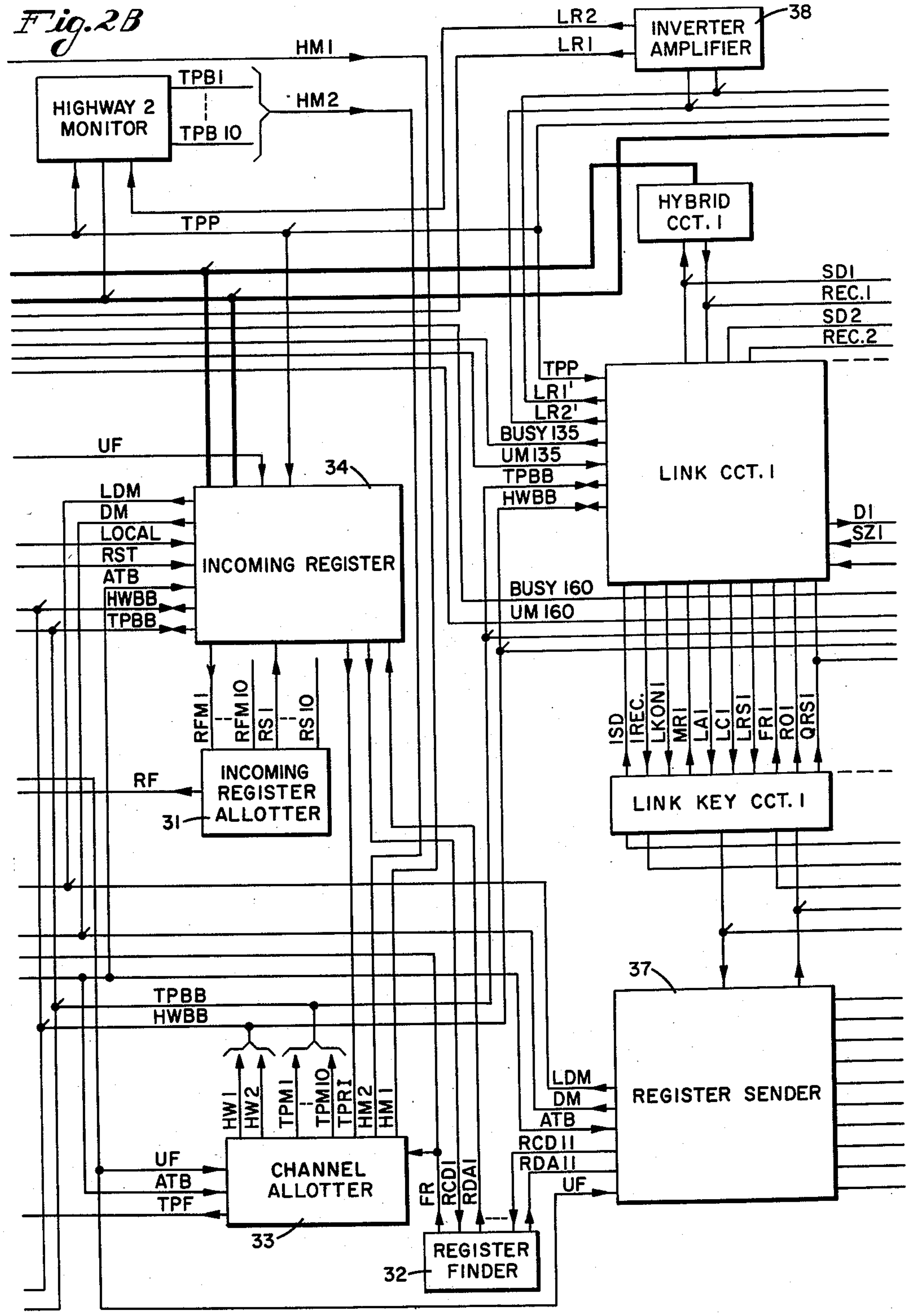
Figure 2C:
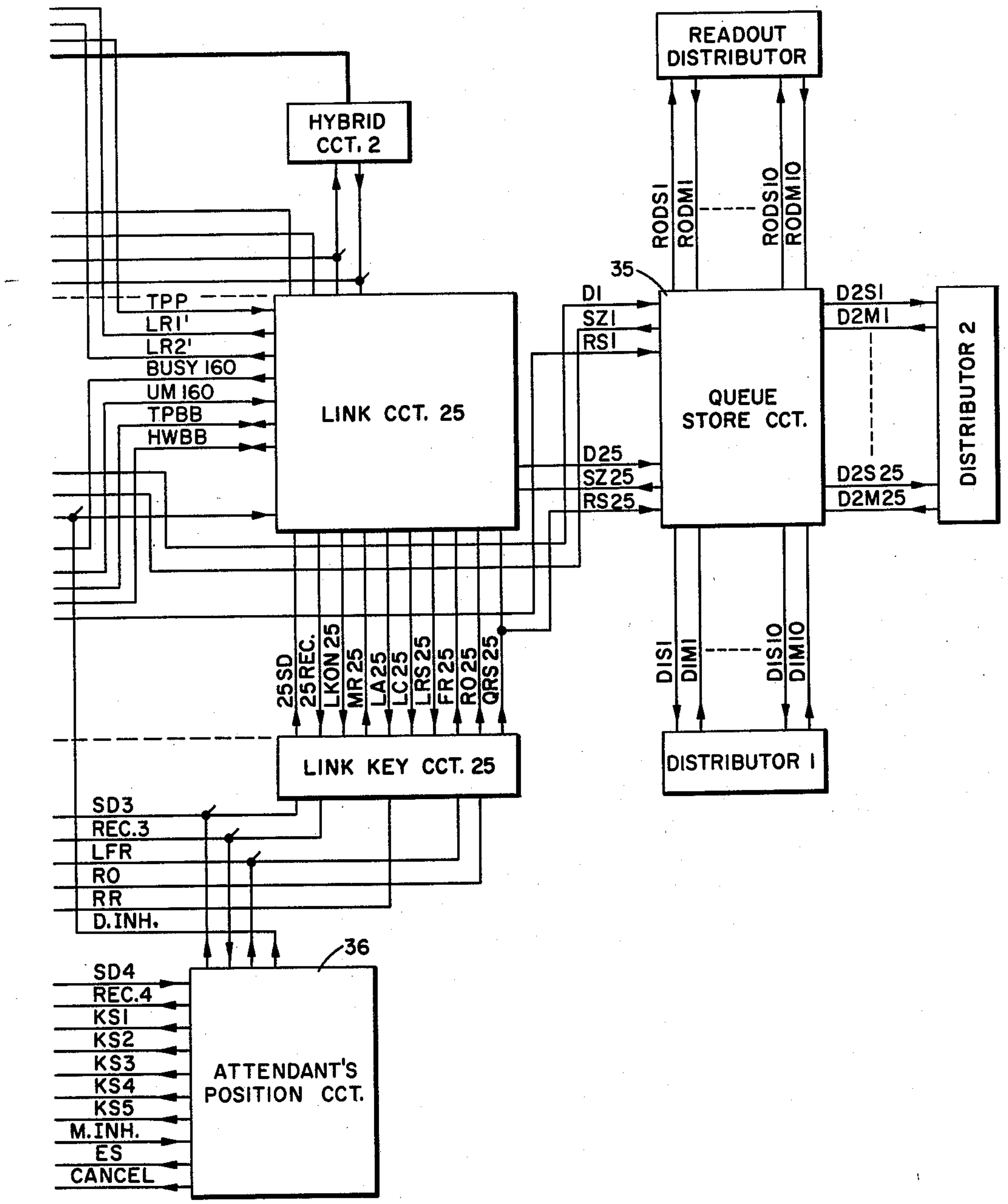

The overall operation of the system in which the invention has been illustrated can best be understood by reference to Figures 2A, 2B, and 2C in conjunction with reference to the trunking diagram shown in Fig. 1. The invention has been illustrated as being embodied in a system developed for the military, but the principles taught by the invention can be practiced in commercial type telephone systems.

As shown in Fig. 1, calls between subscribers in different local offices may be routed through one or more long distance switching centers. For example, a call from a subscriber in local office 1 to a subscriber in local office 9 is routed through long distance switching centers 2, 5, and 8. The call is initiated by the transmission of a voice frequency seize signal over a trunk line interconnecting office 1 and long distance switching center 2, which trunk line is four-wire and may be either physical wire or radio link. In long distance switching center 2, the line terminating unit terminating that trunk line is marked as a unit terminating a trunk line from a local office. For example, unit 22 in Fig. 2A is identified as a local unit by the inclusion of conductor local, which extends between unit 22 and incoming register 34. In response to the seizure of unit 22 and the subsequent marking of conductor local, incoming register 34 is controlled to automatically route the call to an idle one of the attendants' link circuits, such as link circuit 1 of Fig. 2B, in that long distance switching center. When the incoming lamp corresponding to link circuit 1 is illuminated under control of queue store circuit 35, the attendant operates a key in link key circuit 1 to connect link circuit 1 to the attendant's position circuit 36. In accordance with instructions received over the connection from the originating subscriber at local office 1, the attendant then keys the routing digits required to reach local office 9 on the key set associated with the key sender register 37. The keyed number comprises routing digits corresponding to long distance switching centers 5 and 8, an arbitrary digit which may be the digit "1," identifying local, and a digit corresponding to local office 9. The common equipment in long distance switching center 2 then functions to seize an idle terminating unit, such as unit 21 in Fig. 2A, which terminates a trunk line extending to long distance switching center 5, and a seize signal is transmitted over that trunk line to seize the unit terminating that trunk line in long distance switching center 5. In long distance switching center 5, an incoming register, such as incoming register 34 of Fig. 2B, then controls the common equipment, in accordance with the digit received from the key sender register in office 2, to select an idle terminating unit which terminates a trunk line extending between long distance switching centers 5 and 8. The operation in long distance switching center 8 is identical to that just described in long distance switching center 5 with the exception that the arbitrary digit "1" followed by the digit corresponding to local office 9 control the incoming register 34 in that office to control the selection of an idle terminating unit extending to local office 9 in the groups of local terminating units. In the illustrated system, the attendant in office 2 then passes the number of the desired called station to the answering attendant in local office 9. Thus, it can be seen that the extension of a call is controlled from the attendant's position at the first long distance switching center encountered, the intermediate switching centers are each controlled by a single digit to select an idle trunk line to the next long distance switching center, and the terminating long distance switching center is controlled by two digits to select the desired local office.

Figures 2A, 2B, and 2C, which show in block diagram form the equipment located at any one of the long distance switching centers, will now be described in more detail. Although just two line terminating units, namely, units 21 and 22, have been shown, it is to be understood that there is supplied a group of line terminating units 21 for each long distance switching center accessible to the illustrated long distance switching center, and a group of line terminating units 22 for each local office accessible to the illustrated long distance switching center. For example, long distance switching center 5 comprises a group of line terminating units, such as unit 21, which terminate trunk lines or radio links between long distance switching centers 2 and 5 and a group of line terminating units, such as unit 21, which terminate trunk lines of radio links between long distance switching centers 8 and 5. Long distance switching center 5 also comprises a group of line terminating units, such as unit 22, which terminate trunk lines or radio links between local office 3 and long distance switching center 5 and a group of line terminating units, such as unit 22, which terminates trunk lines or radio links between local office 4 and long distance switching center 5. Similarly, only one incoming register, namely, incoming register 34, has been shown but it is to be understood that the number of incoming registers actually employed will be determined by the existing traffic conditions.

The line terminating units, such as 21 and 22, the incoming registers, such 34, and the attendants' link circuits, such as link circuit 1 of Fig. 2B, are all interconnected by one or more transmission highway networks. Two transmission highway networks are shown and are labeled highway 1 and highway 2. Each of the transmission highway networks comprises four wires carrying ten time division multiplex channels. Multiplex pulse generator 28 is provided in the system for the purpose of continuously providing recurring pulses on conductors TP1—TP10, which pulses individually identify the ten channels in each highway network. The pulses applied to conductors TP1—TP10 by multiplex pulse generator 28 may have a recurrence frequency of 12 kc. Preferably, each pulse persists for approximately four microseconds and a guard time of approximately four microseconds is provided between pulses. The pulses applied to conductors TP1—TP10, and which are graphically illustrated in Fig. 3A of the drawings, are routed over cable TPP to all of the line terminating units, to each of the highway monitor circuits, to each of the attendants' link circuits, and to each of the incoming registers. As will be more fully described hereinafter, the above described pulses are used in each of these circuits to periodically activate switches within each of the circuits for the purpose of connecting that circuit to a selected one of the highway networks in a selected time division channel.

The line terminating units, the incoming registers, and the attendants' link circuits are also interconnected by a control network comprising bus bars HWBB and TPBB. Since the illustrated system includes two highway networks, the highway marking bus bar HWBB comprises the two conductors HW1 and HW2. The time position marking bus bar comprises ten conductors TPM1–TPM10, inclusive. Channel allotter 33 is controlled to apply a D.-C. potential to one of the highway marking conductors and to one of the channel marking conductors at any given time for the purpose of individually assigning an idle channel to each calling line.

To illustrate the operation of the system, assume that channel allotter 33 is applying a D.-C. potential to conductors HW1 and TPM1 to thus identify channel 1 on transmission highway network 1 as the next idle channel to be assigned for use. Also assume that incoming register 34 has been assigned for use by incoming register allotter 31. An idle register is identified by the presence of potential on an individual register free marking conductor, such as RFM1, and is seized by the allotter by the application of a potential to an individual register seize conductor, such as RS1. Next assume that a voice frequency seize signal appears on the receive conductors of the trunk line terminated by line terminating unit 21. The trunk line receive conductors are coupled within unit 21 to conductors TCA1 and TCB1, which extend to seize and release scan circuit 23. Circuit 23 is associated with ten or more terminating units and is controlled to continuously scan the TC conductors from each of its associated terminating units for seize, release, and release acknowledge signals. By using a common circuit, such as 23, a single multifrequency receiver is shared by ten or more units instead of having an individual receiver provided for each terminating unit. When the multifrequency receiver in circuit 23 is connected to conductors TCA1 and TCB1, the voice frequency seize signal appearing on those conductors is detected by circuit 23 and a potential is applied to start conductor ST1 to seize line terminating unit 21. Unit 21 is responsive to the receipt of a start potential on conductor ST1 to apply potential to unit connect demand conductor UCD, which is common to all of the units and which extends to calling unit finder circuit 26. Unit 21 also functions at this time to apply potential to busy conductor busy 21 for the purpose of marking unit 21 busy to route selector 27.

Control counter 25, which comprises a sixteen stage ring counter driven from the output of a ten stage ring counter, is controlled to supply X and Y marking signals, which, in pairs correspond to individual ones of the terminating units, to calling unit finder circuit 26 and to route selector 27. The tens stage ring in control counter 25 is driven by 20 kc. clock pulses, of the type shown in Fig. 3A, and the sixteen stage ring is driven by the tenth stage of the ten stage ring. An output signal is taken from each stage of each ring and applied to an individual conductor. Thus, while a signal is appearing on conductor X1, ten successive pulses appear on conductors Y1–Y10, inclusive. The sixteen stage ring is then advanced to mark conductor X2 and conductors Y1–Y10 are again marked in turn. Calling unit finder circuit 26 functions to repeat the marking signals received over conductors X1–X16, inclusive, and Y1–Y10, inclusive, to marking conductors MX1–MX16, inclusive, and MY1–MY10, inclusive, respectively, only when potential is applied to the unit connect demand conductor UCD by one or more calling units, when a register has been assigned for use as denoted by the application of potential to register found conductor RF by the incoming register allotter 31, and when an idle channel is being marked on the control network as denoted by the application of potential to the time position found conductor TPF by channel allotter 33.

Since it was assumed that channel allotter 33 is applying marking signals corresponding to channel 1 on highway network 1 to the control network, that incoming register 34 is assigned for use, and that terminating unit 21 is applying potential to conductor UCD, the calling unit finder circuit 26 now functions to repeat the marking signals received over conductors X1–X16, inclusive, and Y1–Y10, inclusive, to conductors MX1–MX16, inclusive, and MY1–MY10, inclusive. When potential is applied simultaneously to conductors MX2 and MY1, the storage circuit in calling line terminating unit 21 is controlled to read in the highway and channel marking signals applied by channel allotter 33 to the highway and time position marking bus bars HWBB and TPBB, respectively. Also responsive to the receipt of potential on conductors MX2 and MY1, unit 21 functions to discontinue the application of potential to conductor UCD and functions to apply potential to common register start conductor RST. Conductor RST is gated with the individual register seize conductor, such as RS1 in register 34, in each of the incoming registers so that only the storage circuit in the assigned register is controlled to read in the highway and channel marking signals appearing on the control network when a potential is applied to conductor RST by one of the units.

When the storage circuit in register 34 has read in the highway and time position information, a signal is applied to time position read in conductor TPRI, which extends from the incoming registers to channel allotter 33. The signal applied to conductor TPRI is effective in channel allotter 33 to mark channel 1 on highway 1 busy within the allotter so that that time position cannot be assigned to another call and the allotter 33 is further controlled to apply marking signals corresponding to the next idle channel to bus bars HWBB and TPBB.

Each of the line terminating units, each of the incoming registers, and each of the attendants' link circuits comprises a group of switches for connecting that unit, register, or link circuit to each of the transmission highway networks. In accordance with the channel and highway identifying information read into the storage circuit in any unit or register, the particular pulse on the one of the conductors TP1—TP10 corresponding to the assigned channel is gated to the group of switches corresponding to the assigned highway network and is there utilized to activate the switches. Thus in the assumed call, the switches associated with highway 1 in both line terminating unit 21 and in incoming register 34 are turned on by time position 1 pulse TP1 in each frame of the recurring time position pulses and unit 21 and register 34 are thereby connected to highway 1 during time position 1. The seize signal appearing on the receive conductors of the trunk line terminated by unit 21 is now detected by a multifrequency receiver in register 34 and, responsive thereto, incoming register 34 serves to transmit a seize acknowledge signal to highway 1 and thus to unit 21 and the send conductors of the trunk line terminated by unit 21. Since unit 21 terminates a trunk line from another long distance switching center, the call being described is set up under control of a key sender register in a preceding long distance switching center. The key sender in the originating long distance switching center is controlled by the received seize acknowledge signal to discontinue the transmission of a seize signal and to then transmit compounded voice frequency signals corresponding to the digit designation of the next long distance switching center to be utilized in establishing the connection. The multifrequency receiver in register 34 detects the transmitted voice frequency signals corresponding to a particular digit and a digit register in register 34 is set in accordance therewith. The incoming register 34 then transmits a digit acknowledge signal back over the trunk line to the originating office. The digit acknowledge signal also comprises compounded voice frequency signals which correspond to the particular setting of the digit register in incoming register 34, but at least one of the signals in the digit acknowledge signal is of a different frequency than the frequency used to set the digit register. The digit acknowledge signal enables the originating key sender register to compare the setting of the digit register in incoming register 34 with the digital information transmitted by the key sender. If the setting of the digit register in incoming register 34 is correct, the originating key sender transmits a second seize signal over the trunk line to incoming register 34.

The second seize signal received by incoming register 34 controls register 34 to apply potential to register connect demand conductor RCD1, which extends to register finder 32. When register finder 32 finds register 34, as denoted by the application of potential to register demand answer conductor RDA1, register 34 is controlled to read out the channel identification information stored in its storage circuit to the highway and time position marking bus bars HWBB and TPBB, respectively. Simultaneously therewith, register 34 serves to apply potential to one of the digit marking conductors, identified as DM, in accordance with the designation of the called unit registered in the digit register of register 34. Also simultaneously therewith, register finder 32 applies potential to found register conductor FR, which extends to channel allotter 33, to route selector 27, and to calling unit finder 26. The potential applied to conductor FR controls channel allotter 33 to terminate the application of marking potentials to the highway and time position bus bars HWBB and TPBB. The potential applied to conductor FR also controls the calling unit finder circuit 26 to terminate the application of marking potentials to the MX1—MX16 and MY1—MY10 conductors if circuit 26 is in the process of finding a calling unit. Thus when a register is reading out channel identifying information to the bus bars, the channel allotter is disconnected from said bus bars and the calling unit finder is disabled so that the time position marked by the register cannot be seized by a calling unit.

Route selector 27 is controlled by the marking applied to one of the conductors DM by the incoming register to select the desired called group of units and is further controlled by the signals successively applied to conductors X1—X16 and Y1—Y10 by control counter 25 and by busy marking signals applied to the busy conductors, such as busy 21 and busy 22, to select an idle unit in the selected group of units. If, as was assumed, the call is to be routed to another long distance switching center, a line terminating unit identical to unit 21 is seized by the route selector by the application of potential to the unit marking conductor, such as UM21, corresponding to that unit. If there is no idle unit available, route selector 27 applies a potential to all trunks busy conductor ATB which controls the incoming register 34 to return a busy signal to the originating office and also controls channel allotter 33 to resume its operation. When an idle unit in the called group is seized, route selector 27 functions to apply potential to the unit found conductor UF, which extends to the channel allotter, the incoming registers, and to the key sender registers. Simultaneously therewith, route selector 27 applies potential to inhibitor conductor INH, which extends to the control counter 25 for the purpose of momentarily halting the stepping of the ring circuits in that circuit so that the X and Y conductors corresponding to the seized unit remain marked for a short period of time. When the seized unit applies ground to its individual busy conductor, such as busy 21, the route selector removes potential from conductors UF and INH. Incoming register 34 is controlled by the potential applied to conductor UF and by the next occurring 20 kc. clock pulse, of the type shown in Fig. 3R, to restore to its normal unoperated condition. Channel allotter 33 is controlled by the potential applied to conductor UF and by the next occurring clock pulse to re-apply the marking potentials corresponding to the next idle channel to bus bars HWBB and TPBB.

The storage circuits in the calling and called units now control the connection of their respective units to highway 1 during time position 1 for the transmittal of speech and supervisory signals between the units for the duration of the call.

At the termination of the call, a voice frequency release signal is transmitted over either the calling trunk line or the called trunk line and is detected by the seize and release scan circuit associated with either the calling unit or called unit, respectively. If it be assumed that a release signal appears on the receive conductors of the trunk line associated with line terminating unit 21, the receive signal is detected on conductors TCA1 and TCB1 by seize and release scan circuit 23, and circuit 23 functions to apply potential to conductor R1 which extends to unit 21. When potential is applied to conductor R1, unit 21 functions to apply a voice frequency release acknowledge signal to the send conductors of its associated trunk line for a purpose which will become apparent as the description proceeds. The release signal received over the trunk line also appears in time position 1 on highway 1 and is detected by a multifrequency receiver in highway 1 monitor circuit 24, which circuit is controlled to continuously scan the ten time position channels on highway 1 for release and release acknowledge signals. Unit 21 is released and its storage circuit returned to its normally unoperated condition responsive to the receipt of potential on conductor R1 but only after a time delay of sufficient duration to allow the release signal to be detected by highway 1 monitor circuit 24. The received release signal is regenerated in highway 1 monitor circuit 24 and applied in time position 1 to highway 1. The regenerated release signal is demodulated in the called line terminating unit and applied to the send conductors of the trunk line associated with the called unit. The regenerated release signal transmitted over the called trunk line serves to release the incoming line terminating unit in the succeeding long distance switching center after that unit has functioned to return a release acknowledge signal over the called trunk line to the illustrated long distance switching center.

The release acknowledge signal returned over the called trunk line is detected by the seize and release scan circuit associated with the called unit and potential is applied to the release acknowledge conductor, such as RA1, which extends to the called unit. The release acknowledge signal received over the called trunk line also appears in time position 1 on highway 1 and is detected in highway 1 monitor circuit 24. Highway 1 monitor circuit 24 is controlled by the received release acknowledge signal to terminate the regeneration of the release signal and to apply a potential to time position busy 1 conductor TPB1, which extends in highway monitor 1 cable HM1 to channel allotter 33. In channel allotter 33, time position 1 on highway 1 is marked as idle responsive to the receipt of a potential on conductor TPP1 in cable HM1. The called line terminating unit is released and its storage circuit returned to its normally unoperated condition responsive to the receipt of potential on conductor RA1 but only after a delay of sufficient duration to allow the release acknowledge signal to be detected by highway 1 monitor circuit 24. Thus, it can be seen that the release signal is regenerated in each succeeding long distance switching center and that the regenerated release signal is transmitted until a release acknowledge signal is received from the next succeeding office. This feature is incorporated in the illustrated system for the purpose of offsetting the effects of fading when radio links are used in the system.

The operation of the long distance switching center, shown in Figs. 2A, 2B, and 2C, is somewhat different from the above when a call is originated at a local office having access to the illustrated long distance switching center. As previously explained, the line terminating units which terminate trunk lines from local offices are characterized as such by a local conductor which extends between those units and the incoming registers. When a local office terminating unit, such as unit 22, is seized on a call from a local office to the illustrated long distance switching center, a potential is applied in that unit to conductor local simultaneously with the application of potential to the register start conductor RST. Under these conditions, the assigned incoming register is controlled to automatically store the digit corresponding to the attendants' link circuits, which digit may be the digit "0," in its digit register. The incoming register immediately calls for the register finder and the route selector is controlled to seize an idle one of the attendants' link circuits, such as link circuit 1 of Fig. 2B. Link circuit 1 is seized by the route selector over units marking conductor UM135, which is individual to link circuit 1. The time position and highway information stored in the incoming register is read out to bus bars HWBB and TPBB and read in by a storage circuit in link circuit 1 in the exact same manner as previously described. Thus, responsive to seizure, the calling line terminating unit and an idle one of the link circuits are connected to an idle channel on one of the highway networks.

It can be seen that all of the link circuits 1–25, inclusive, are connected to highway 1 by send and receive conductors SD1 and REC.1 and through hybrid circuit 1. Similarly, link circuits 1–25, inclusive, are connected to highway 2 by send and receive conductors SD 2 and REC.2 and through hybrid circuit 2.

When link circuit 1 is seized over conductor UM135 by the route selector, link circuit 1 functions to apply potential to demand conductor D1 which extends to queue store circuit 35. Queue store circuit 35 comprises ten or more storage positions each comprising a storage element corresponding to each link circuit. Distributors 1 and 2 control the activation of a single storage element in each storage position in the same order that potential is applied to the individual demand conductors, such as conductor D1. The read out distributor serves to read out the storage positions on a one at a time basis in the same order in which the calls were stored. When the read out distributor advances to the storage position in which the demand from link circuit 1 is registered, an incoming lamp corresponding to link circuit 1 is illuminated and potential is applied to seize conductor SZ1 which extends to link circuit 1. Link circuit 1 is responsive to the receipt of potential on conductor SZ1 to apply potential to link-on conductor LKON1 which prepares link key circuit 1 for operation.

When the attendant operates a key associated with link key circuit 1 responsive to the illumination of the incoming lamp corresponding to link circuit 1, potential is applied to the queue reset conductor QRS1 to remove the potential from demand conductor D1 in link circuit 1 and to reset the activated storage element in queue store circuit 35 corresponding to link circuit 1. When the storage element corresponding to link circuit 1 is reset, the read out distributor is advanced to the next storage position.

Signals received in the assigned time pos'tion on the assigned highway network are demodulated in link circuit 1, passed over receive conductors 1REC. to link key circuit 1, and then coupled over receive conductors REC.3 to the attendant's position circuit 36 when the key in link key circuit 1 is operated.

In accordance with oral instructions received over the trunk line and transmitted in the assigned time position on the assigned highway network to the link circuit, and coupled over conductors 1REC. and REC.3, the operator at the answering position circuit 36 keys the digits corresponding to the route required to reach the desired called party. The operation of any particular key results in the application of a D.-C. potential to a unique combination of two of the five conductors KS1–KS5, inclusive. The digit information received over conductors KS1–KS5 is stored in the key sender register and at the end of the keying operation, which is indicated by the application of potential to end of selection conductor ES, key sender register 37 applies potential to register connect demand conductor RCD11. When the key sender register is found by register finder 32, as denoted by the application of potential to register demand answer conductor RDA11, the key sender register applies potential to read out conductor RO, which extends to the link circuits. Link circuit 1 is controlled by the potential applied to conductor RO, and coupled through link key circuit 1 to conductor RO1, to control its storage circuit to read out the stored highway and channel marking information to bus bars HWBB and TPBB. Digit marking information corresponding to the first digit stored in the digit register in the key sender register is simultaneously applied by the key sender register to one of the digit marking conductors DM for the purpose of controlling route selector 27 to seize an idle unit in the group of line terminating units corresponding to said digit marking. The key sender register then functions to apply a voice frequency seize signal to send conductors S4 and thus over send conductors SD3 and 1SD to link circuit 1. In link circuit 1, the seize signal is multiplexed on to the assigned highway in the assigned time position and thus routed to the line terminating unit corresponding to the called office and over the trunk line or radio link to the called office. As previously mentioned, the key sender register 37 continues to transmit a seize signal until a seize acknowledge signal is received from the incoming register in the called office over conductors 1REC., REC.3, and REC.4. When a seize acknowledge signal is received, register sender 37 discontinues the transmission of a seize signal and then transmits a compound voice frequency signal corresponding to the next registered digit to send conductors SD4 and thus to the called office. The digit designation signal is transmitted until a digit acknowledge signal is received. As previously explained, if the digit acknowledgment signal is not correct for the digit designation signal transmitted, register sender 37 transmits a voice frequency cancel signal and then retransmits the canceled digit designation.

When the call is completed, the attendant retires from the connection by restoring the seize key in link key circuit 1 and is then free to process another call. When a release signal is received over either the calling or called trunk lines, it is detected by a multifrequency receiver in link circuit 1 and potential is applied to either conductor LC1 or LA1, respectively, to illuminate a lamp in link key circuit 1. The attendant then operates a release key in link key circuit 1 to apply potential to manual release conductor MR1 to restore link circuit 1 to its normal condition. Link circuit 1 functions to apply potential to conductor LRS1 to restore all of the circuits in link key circuit 1 to normal.

If the attendant should wish to reset the digit registers in register sender 37 before the end of selection key has been operated and thus before the sender has started to transmit, a cancel key is operated in position circuit 36 and potential is applied to conductor cancel for this purpose. If it is desired to cancel transmitted digits when the attendant realizes that a mistake in keying has been made or if an ATB condition is encountered and the attendant desires to reroute the call, a forward release key at position circuit 36 is operated and potential is applied to link forward release conductor LFR. The potential on conductor LFR is routed through operated link key circuit 1 and applied to conductor FR1. In link circuit 1, the potential on conductor FR1 is converted to pulses in the assigned time position and the resulting pulses are applied to conductor LR1' (assuming that highway 1 is the assigned highway). The pulses on conductor LR1' are amplified and inverted by inverter amplifier 38 and routed over conductor LR1 to highway 1 monitor circuit 24 where they are effective to cause the release of all circuits in the forward direction only. That is, the called line terminating unit and the circuits in the distant offices are released but the assigned time position is not marked idle to the channel allotter so that the calling line terminating unit and link circuit 1 remain activated.

When the register sender 37 is seized by the register finder 32 to initiate the transmission of digit information, a timing circuit is activated in register sender 37 to measure a ten second "no acknowledgment" period during which the call should be completed. During this period, potential is applied to microphone inhibit conductor MINH for the purpose of cutting off the attendant's microphone so as to prevent interference with the voice frequency signaling. Simultaneously therewith, potential is applied in position circuit 36 to dial inhibit conductor DINH for the purpose of controlling link circuit 1 to route the digit designation signals to the pair of highway conductors over which transmission is made to the called circuits.

The operation of the illustrated long distance switching center is slightly different from the above when the desired called line is associated with a local office associated with the illustrated long distance switching center. As previously described, an arbitrary digit "1" is prefixed to the digit identifying the terminating local office so that the incoming register, such as 34, is controlled to apply the digit marking corresponding to the designation of the desired local office to a local set of digit marking bus bars, such as LDM. This feature is included in the illustrated system so that the long distance switching center can serve more than ten groups of local and long distance trunk lines.

Only the hybrid circuits, an attendant's link circuit, a link key circuit, an attendant's position circuit, the queue store circuit, and a queue store distributor circuit are shown and described in detail in this application. The remaining circuits shown in block diagram form in Figs. 2A, 2B, and 2C are shown and described in complete detail in the above identified copending application.

*Hybrid circuits*

Figure 4:
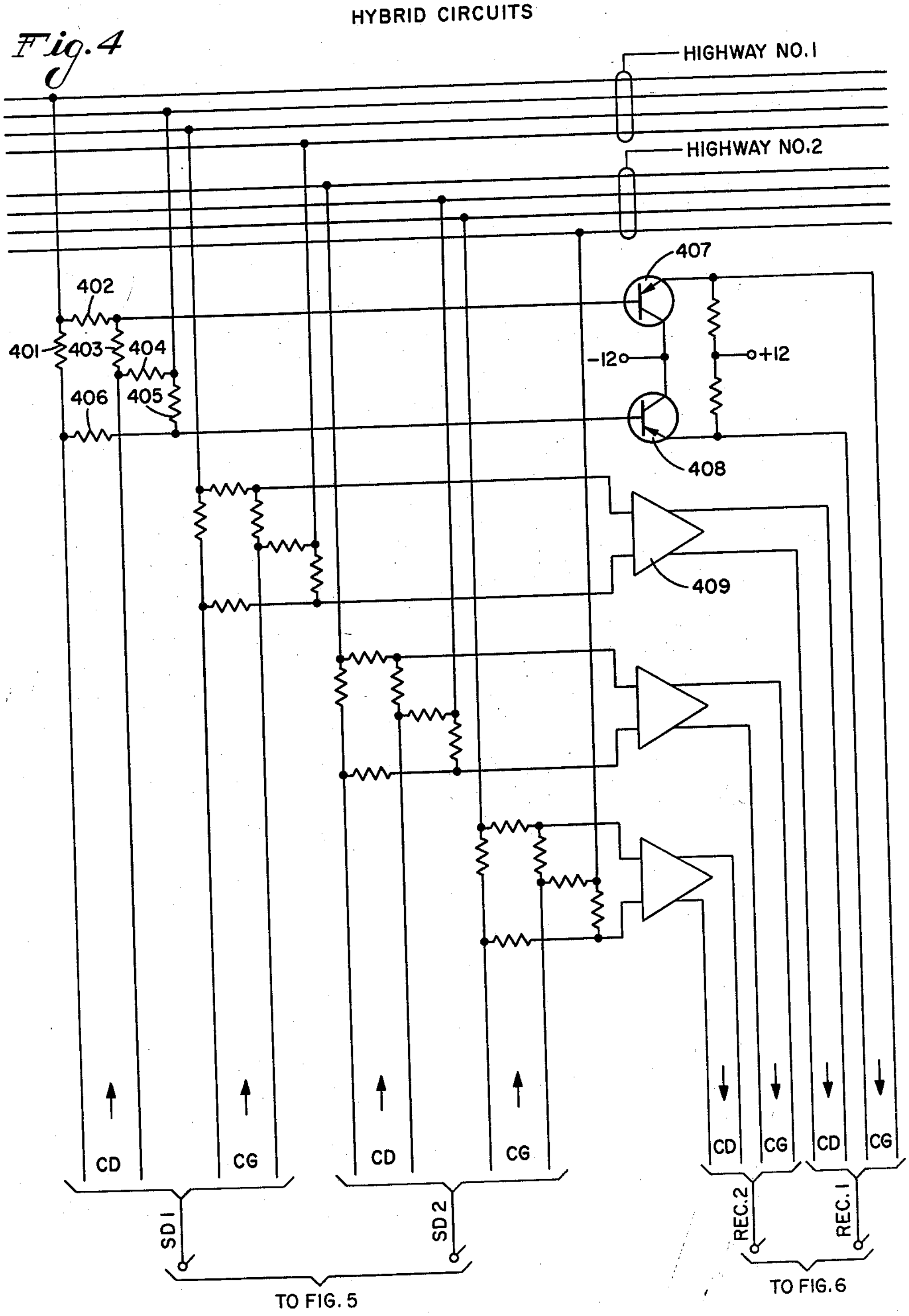
Fig. 4 shows details of hybrid circuits for connecting attendants' link circuits to a transmission highway network.

The hybrid circuits, which are shown in Fig. 4, are utilized to connect the attendants' cabinet equipment to the transmission highway networks. As fully described in the above identified copending application, calling line terminating units transmit signal samples to the upper pair of highway conductors and receive signal samples from the lower pair of highway conductors, while called line terminating units transmit signal samples to the lower pair of highway conductors and receive signal samples from the upper pair of highway conductors. Hybrid circuits are required to connect the attendants' cabinet to the highways since the attendants' cabinet must send to and receive from both the calling and called line terminating units in the process of establishing a connection. For example, the attendant must converse with the calling party to determine the desired route, supervisory and digit designation information must be transmitted to the called unit, and release signals may be received from either the calling or called units.

Each resistor hybrid network comprises four resistors, namely, resistors 401, 402, 404, and 405, of equal resistance values, and two resistors, namely, resistors 403 and 406, each having twice the resistance value of each of the aforementioned resistors. Thus, signal samples appearing on the upper pair of highway 1 conductors from a calling unit are coupled to and amplified by push-pull connected, emitter follower, amplifier transistors 407 and 408 and applied to the calling pair of receive conductors REC.1, signal samples appearing on the lower pair of highway 1 conductors from a called unit are coupled to and amplified by amplifier 409 and applied to the called pair of the receive conductors REC.1, signal samples appearing on the called pair of the sending conductors SD1 are coupled to the upper pair of highway 1 conductors for transmission to the called unit, and signal samples appearing on the calling pair of the send conductors SD1 are coupled to the lower pair of highway conductors for transmission to the calling unit. As illustrated, a duplicate set of equipment is, of course, provided for highway 2.

*Link circuit 1*

Figure 5:
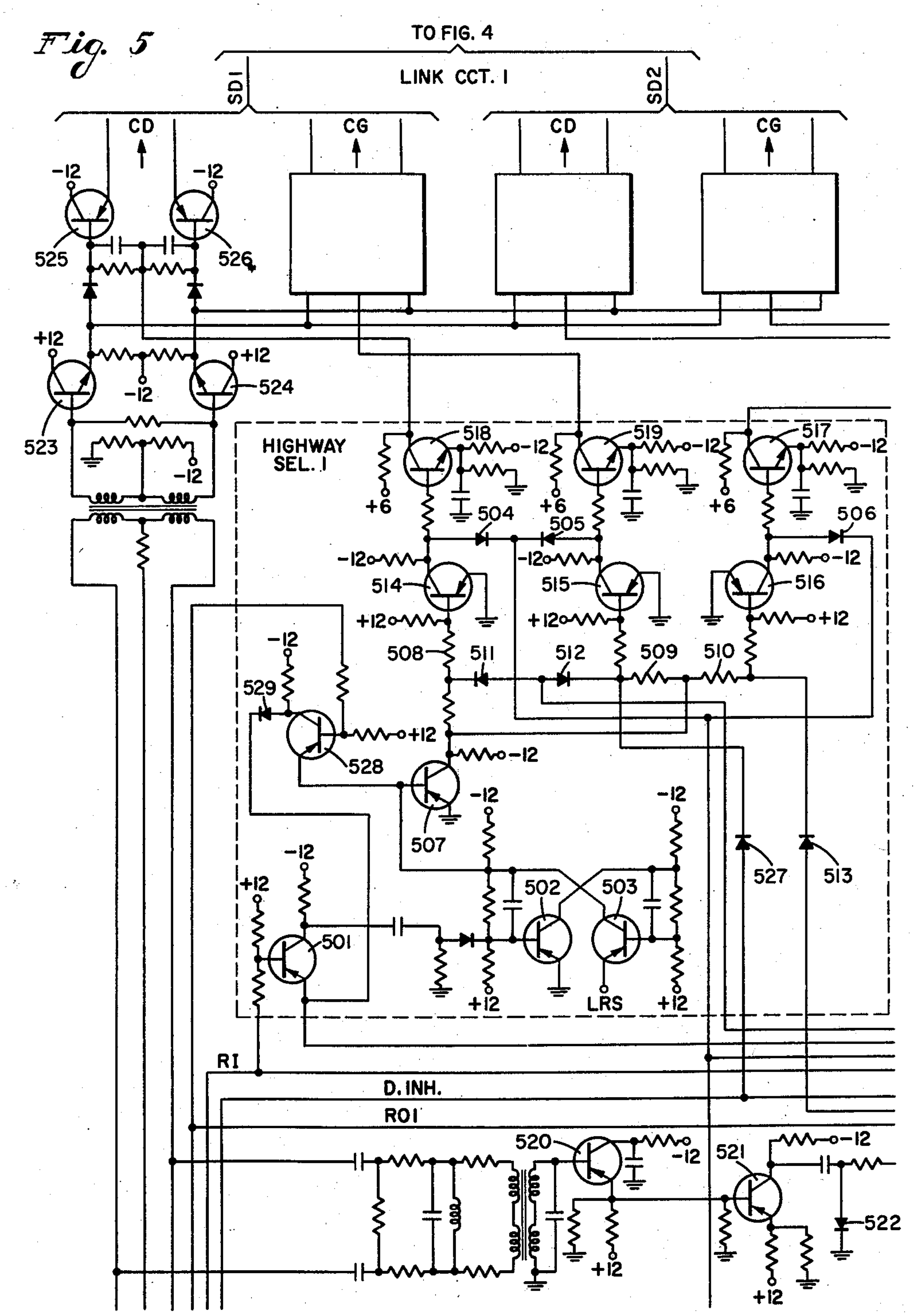
Figure 6:
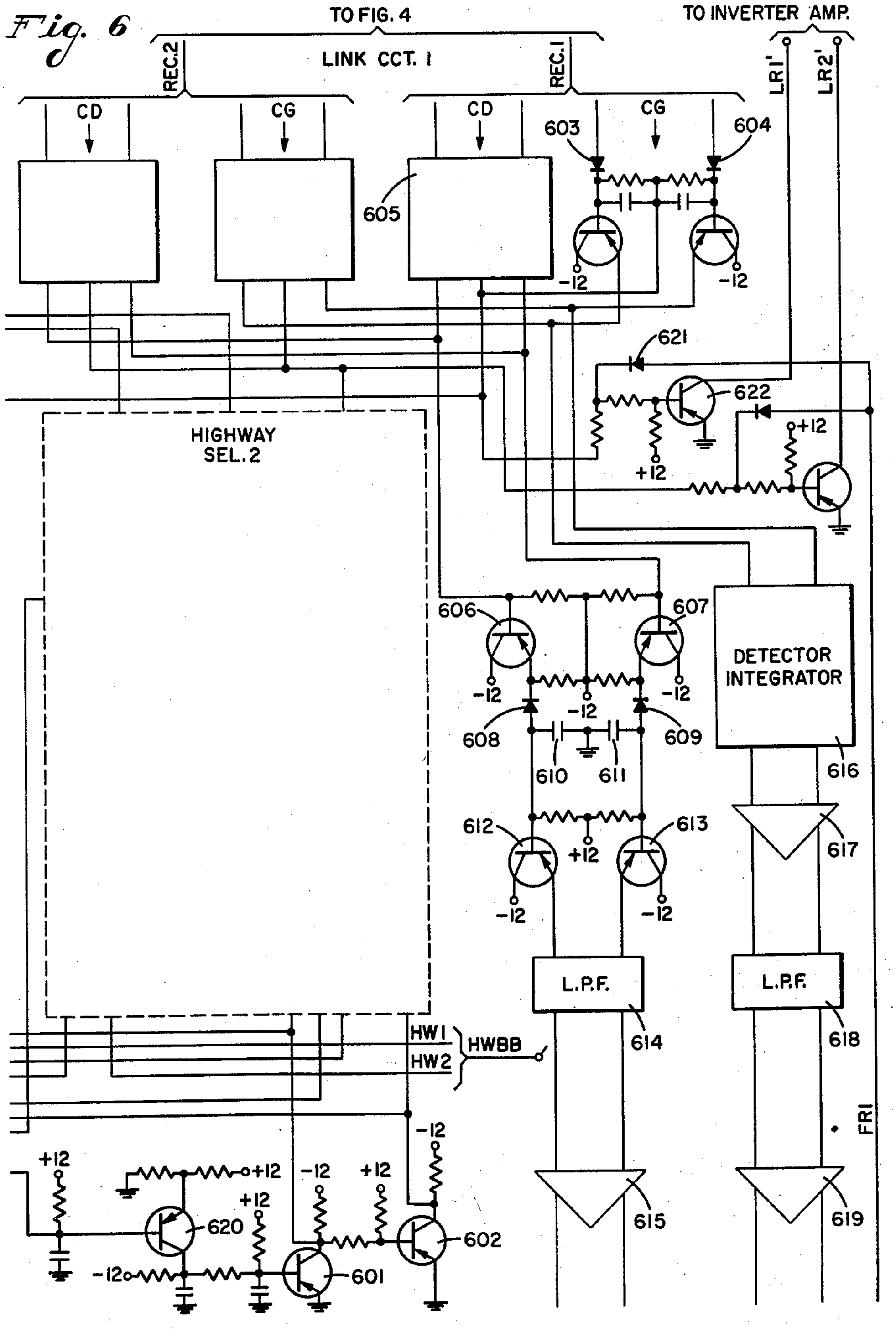
Figure 9:
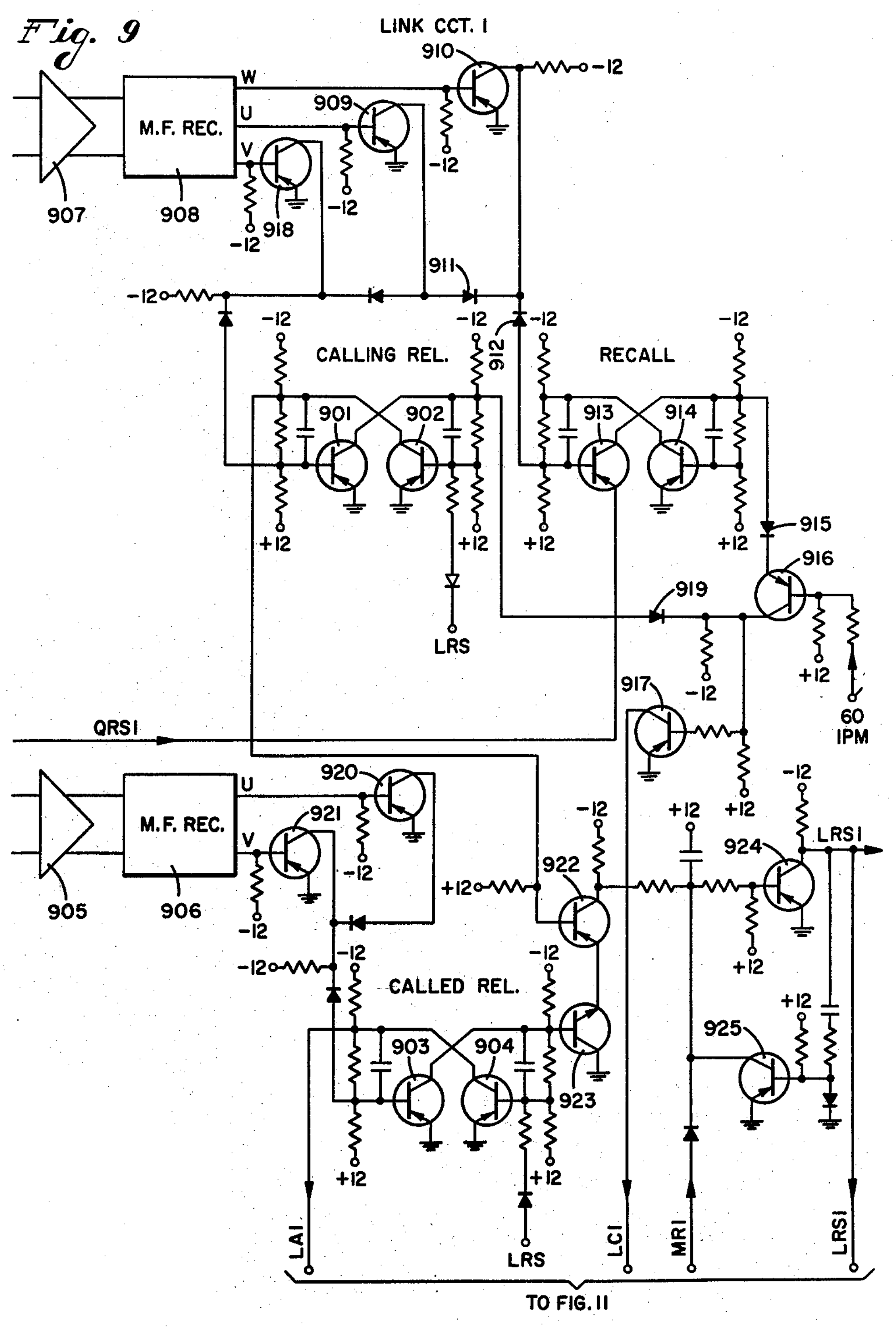

When link circuit 1, which is shown in detail in Figs. 5–9, inclusive, is in the idle or reset condition, the send gates of Fig. 5 and the receive gates of Fig. 6 are closed, each flip-flop circuit in which the emitter of one transistor is returned to either reset conductor LRS1 or to reset conductor QRS1 is in the condition wherein the other transistor in that flip-flop circuit is conductive, the calling release and called release flip-flop circuits of Fig. 9 are in the condition wherein transistors 902 and 904, respectively, are conductive, and the flip-flop circuit in each of the ten time position store circuits (Fig. 8) is in the condition in which both transistors comprising the flip-flip circuit are non-conductive. In the idle condition, the queue demand flip-flop circuit comprising transistors 701 and 702 is in the condition in which transistor 701 is non-conductive and a negative potential is, therefore, applied to busy marking conductor busy 135, which is individual to the illustrated link circuit, and serves to mark the illustrated link circuit as idle to the route selector.

It will be recalled from the general description that when a call is initiated on a line terminating unit which terminates a trunk line or radio link from a local office, the incoming register automatically registers the digit "0" and then controls the route selector to select an idle one of the attendants' link circuits. Simultaneously therewith, the incoming register is controlled to read out time position and highway information to the time position bus bars TPBB and to the highway bus bars HWBB for the purpose of controlling the selected link circuit to seize the time position channel seized by the calling line terminating unit.

The illustrated link circuit is seized by the route selector by the application of a positive-going potential to the units marking conductor UM135. The positive-going potential swing on conductor UM135 is coupled through capacitor 703 and diode 704 to trigger the link seize flip-flop circuit to the condition in which transistor 705 is conductive. When transistor 706 becomes non-conductive, a negative potential is applied to the read in conductor RI and the highway selector and time position store circuits in the illustrated link circuit are controlled to read in the highway and channel marking signals applied to bus bars HWBB and TPBB, respectively, by the incoming register. The base of a transistor corresponding to transistor 501 in each highway selector and the base of a transistor corresponding to transistor 707 in each time position store circuit are returned to conductor RI, the emitter of each transistor corresponding to 501 is returned to an individual one of the highway marking bus bar conductors, and the emitter of each transistor corresponding to 707 is returned to an individual one of the time position marking bus bar conductors. If it is assumed that the incoming register is applying ground potential to highway conductor HW1 and to time position marking conductor TPM1, thus identifying channel 1 on highway 1, transistors 501 and 707 are rendered conductive. The transistors corresponding to 501 and 707 in the other highway selector and time position store circuits, respectively, are not rendered conductive since their emitter electrodes are returned to minus twelve volt potential appearing on their individually associated highway marking and time position marking conductors. The positive-going potential swing appearing at the collector of conducting transistor 501 is utilized to trigger the flip-flop circuit comprising transistors 502 and 503 to the condition wherein transistor 503 is conductive and transistor 502 is non-conductive. Similarly, the positive potential swing at the collector of conducting transistor 707 is utilized to trigger the flip-flip circuit comprising transistors 708 and 709 to the condition wherein both transistors are conductive.

The next occurring positive-going clock pulse on conductor 20 kc. trigger, which pulses are graphically illustrated in Fig. 3A, is coupled through capacitor 710 and diode 711 to the base of transistor 705 and serves to reset the link seize flip-flop circuit so that transistor 706 is conductive. When transistor 706 becomes conductive, conductor RI and the base electrodes of each transistor corresponding to 501 and each transistor corresponding to 707 rise to ground potential. Thus, the storage circuit in the illustrated link circuit is controlled to read in highway and channel marking signals appearing on the bus bars HWBB and TPBB and the read in control circuits are then disabled so that further signals appearing on those bus bars have no effect on the illustrated link circuit.

When the link seize flip-flop circuit is first triggered to the condition wherein transistor 706 is non-conductive and read in conductor RI goes negative, the queue demand flip-flop circuit is triggered through capacitor 712 and diode 713 to the condition in which transistor 701 is conductive. The resulting ground potential at the collector of transistor 701 is applied to the demand conductor D1, which extends to the queue store circuit, is applied to conductor busy 135 to mark link circuit 1 busy, and is also coupled through capacitor 801 and diode 802 to trigger the link waiting flip-flop circuit to the condition in which transistor 804 is conductive. When transistor 803 becomes non-conductive, the emitter of emitter follower transistor 805 goes negative and transistor 806 is rendered conductive to illuminate the link waiting lamp 807, which is common to all of the link circuits, for the purpose of indicating to the attendant that a call is waiting on one of the link circuits.

The queue store circuit is responsive to the application of ground potential to conductor D1 to place the call from the illustrated link circuit in a queue which assures that the incoming calls will be answered by the attendant in the exact same order as they are placed. When the call on the illustrated link circuit is to be answered, the queue store circuit applies ground potential to seize conductor SZ1 to trigger the link-on flip-flip circuit through capacitor 714 and diode 715 to the condition in which both transistors 716 and 717 are conductive. When transistor 716 becomes conductive, ground potential is applied to conductor LKON1 to prepare the link key circuit individually associated with the illustrated link circuit for operation. Simultaneously with the application of ground potential to conductor SZ1, the queue store circuit serves to illuminate the incoming lamp associated with link circuit 1 to indicate to the attendant that the call on link circuit 1 is the next call to be answered. If a queue store circuit is not provided in the system, conductors D1 and SZ1 are strapped so that the operation of the queue demand flip-flop circuit results in the immediate operation of the link-on flip-flip circuit.

Figure 7:
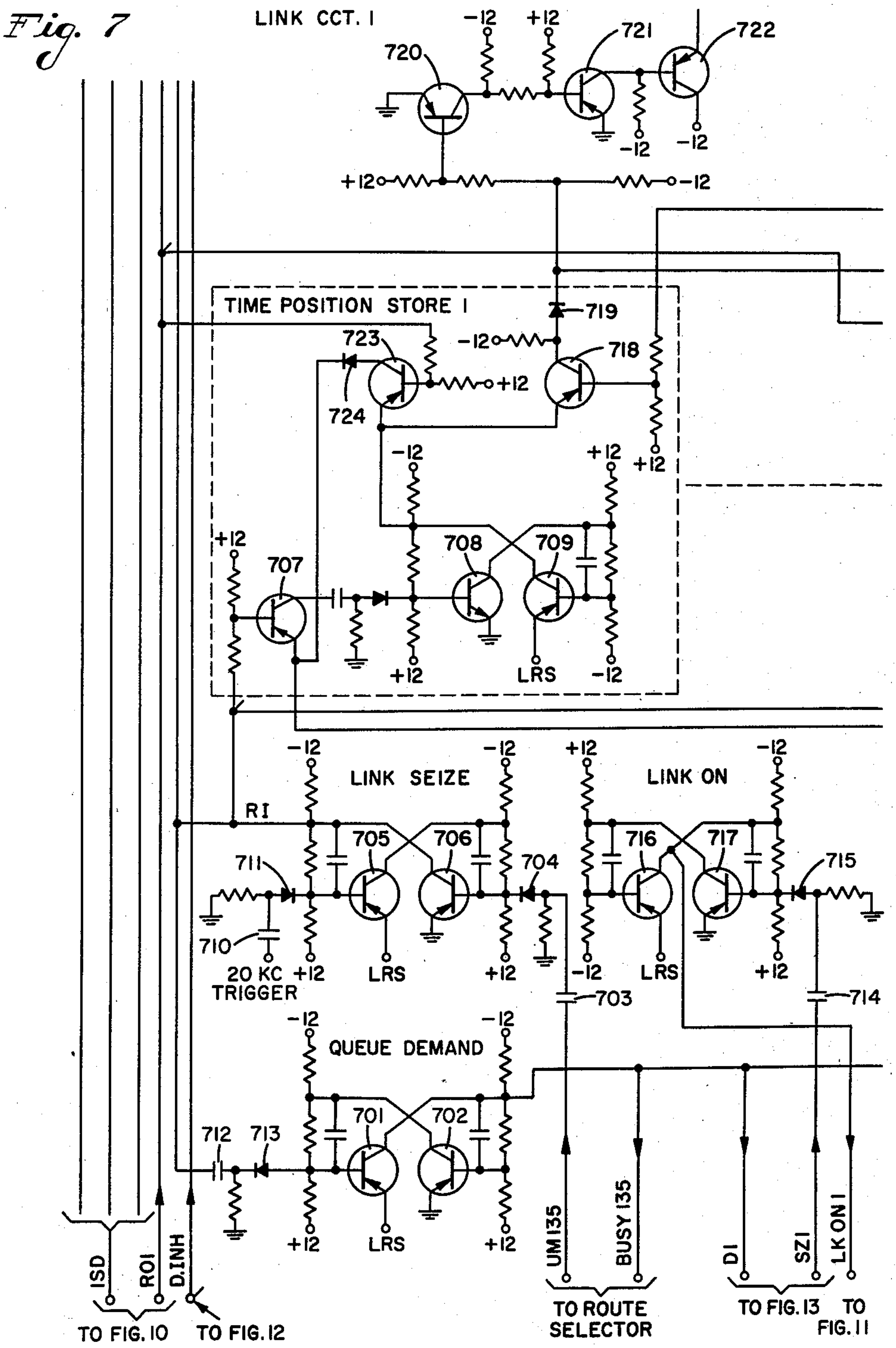
Figure 8:
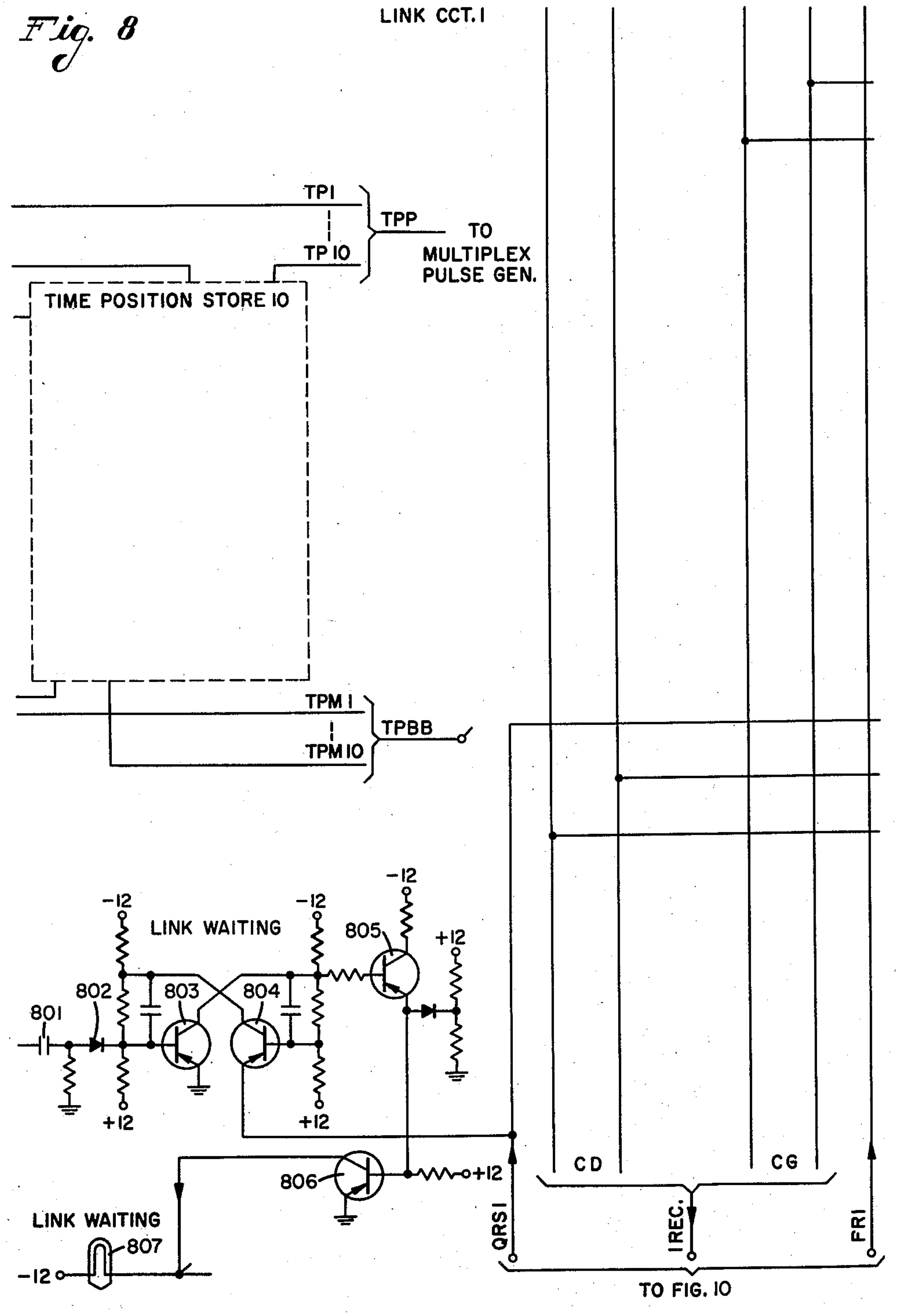

Returning to the consideration of the time position store 1 circuit of Fig. 7, it can be seen that when transistors 708 and 709 are rendered conductive responsive to the reading in of marking for time position channel 1, ground potential is applied to the emitter of transistor 718. The base of transistor 718 is individually connected to the time position 1 conductor TP1 and when a negative pulse is received on that conductor, transistor 718 is rendered conductive and a positive-going pulse is coupled through diode 719 to the base of transistor 720. Diode 719 forms one input of a ten input "or" gate for positive pulses and the particular time position pulse coupled through the gate is determined by the setting of the time position store circuits. As just described, when the flip-flip circuit in time position store 1 circuit is operated, the pulse coupled through the "or" gate occurs in time position 1. As explained in the general description, the pulses appearing on conductors TP1–TP10, inclusive, occur at a frequency of 12 kc. and may be generated by any suitable pulse generator. Pulses TP1–TP10 are graphically illustrated in Fig. 3A.

The positive-going pulses in time position 1 coupled through diode 719 are utilized to render transistor 720 non-conductive and the resulting negative-going pulses at the collector of transistor 720 render transistor 721 conductive. The positive-going pulses at the collector of transistor 721 are coupled to the base of emitter follower transistor 722 and are repeated as positive-going pulses at the emitter of transistor 722 and applied to the cathode terminals of diodes corresponding to 504, 505, and 506 in each of the highway selectors.

Returning to the consideration of highway selector 1, it can be seen that when transistor 503 of the flip-flop circuit comprising transistors 502 and 503 becomes conductive responsive to the reading in of marking for highway 1, ground potential is applied to the base of transistor 507 to render transistor 507 non-conductive. Thus, minus twelve volt potential is applied through resistors 508, 509, and 510 to the cathode terminals of diodes 511, 512, and 513, respectively. The anode terminals of diodes 511 and 512 are returned to ground potential at the collector of normally conducting transistor 601 so that diodes 511 and 512 are biased in the forward direction and ground potential coupled through said diodes holds transistors 514 and 515 non-conductive. The anode terminal of diode 513 is returned to minus twelve volt potential at the collector of normally non-conductive transistor 602 so that when the collector of transistor 507 goes negative, transistor 516 is rendered conductive and ground potential is applied to the anode terminal of diode 506. Now when the emitter potential of transistor 722 rises to ground during time position 1, pulse amplifier transistor 517 is rendered conductive to transmit a negative pulse to the calling and called receive gates associated with highway 1. It is to be noted that the pulses appearing at the emitter of transistor 722 are blocked from the base electrodes of pulse amplifier transistors 518 and 519, which control the highway 1 called send and calling send gates, respectively, by diodes 504 and 505, respectively, which are biased in the reverse direction because of the non-conductivity of transistors 514 and 515, respectively. Similarly, the pulses are blocked in the highway 2 selector because of the non-conductivity of the transistor corresponding to transistor 503 in the flip-flop circuit in that highway selector. Thus, a negative pulse is applied to the called and calling receive gates associated with highway 1 in time position 1 in each frame of the recurring pulse frames for the duration of the call under consideration except when the attendant is sending information as will be described more fully hereinafter.

Examining the calling receive gate associated with highway 1, which gate is identical to the other calling and called receive gates, it can be seen that the gate comprises diodes 603 and 604. The cathode terminals of diodes 603 and 604 are returned to the collector of pulse amplifier transistor 517, which collector stands at plus six volt potential except during time position 1. During time position 1, the collector of transistor 517 drops to approximately minus six volt potential and diodes 603 and 604 are biased for conduction and pass any signals appearing on the upper pair of conductors of highway 1. Similarly, the called receive gate 605 passes any signals appearing on the lower pair of conductors of highway 1. The signal samples coupled through the called receive gate 605 are amplified by the push-pull connected, emitter follower, amplifier transistors 606 and 607, detected by diodes 608 and 609, and integrated by capacitors 610 and 611. The resulting demodulated signals are amplified by push-pull connected, emitter follower, amplifier transistors 612 and 613, passed through low-pass filter 614 to remove any 12 kc. signals, amplified by amplifier 615, and applied to the called 1REC. conductors which extend to the link key circuit. Similarly, signal samples passed by the calling receive gate are detected and integrated in detector integrator 616. The resulting demodulated signals are amplified by amplifier 617, passed through low-pass filter 618, amplified by amplifier 619, and applied to the calling 1REC. conductors which extend to the link key circuit. The signals appearing on the called 1REC. conductors are also amplified by amplifier 905 and applied to the input of multifrequency receiver 906 which is designed to detect release signals, The signals appearing on the calling 1REC conductors are also amplified by amplifier 907 and applied to the input of multifrequency receiver 908 which is designed to detect release and recall signals.

When the attendant operates the seize key in link key circuit 1 in response to the illumination of the incoming lamp associated with link circuit 1, a negative-going potential is applied to conductor QRS1 to reset the link waiting flip-flop circuit to the condition wherein transistor 803 is conductive and thereby extinguish the link waiting lamp 807 if other calls on other link circuits are not awaiting attention.

The attendant can now converse with the calling party to determine the desired called number. The attendant's speech signals appearing on the conductors 1SD are passed through a suitable filter to the base of emitter follower transistor 520. The signals are amplified by transistors 520 and 521 and detected by diode 522. The detected signals render transistor 620 conductive, transistor 601 non-conductive, and transistor 602 conductive. The various capacitors associated with this voice detection circuit serve to hold the transistors 620, 601, and 602 in the above described condition for about one second after the termination of transmission of speech or voice frequency supervisory signals. Whenever transistor 601 becomes non-conductive, transistors 514 and 515 become conductive and the positive pulses in time position 1 appearing at the emitter of transistor 722 render transistors 518 and 519 conductive to open the calling and called send gates associated with highway 1. The attendant's speech signals are also amplified by the push-pull connected, emitter follower, transistor amplifiers 523 and 524 and sampled in time position 1 by the calling and called send gate diodes. The signal samples are amplified by push-pull connected, emitter follower, amplifier transistors 525 and 526 in the calling and called send gates and coupled to the highway conductors.

In accordance with the oral instructions received from the calling party, the attendant keys the desired called number and then operates the end of selection key provided in the position circuit. As described in the general description, the register sender then sends a demand signal to the register finder. When the register finder seizes the register sender, the register sender transmits digit marking information corresponding to the first registered digit to the route selector which seizes an idle line terminating unit terminating a trunk line or radio link to the digit marking identified office. Simultaneously therewith, the register sender applies a negative potential through link key circuit 1 to read out conductor RO1 for the purpose of controlling the illustrated link circuit to read out highway and time position marking information to the highway and time position bus bars so that information can be read into the line terminating unit selected by the route selector. This information is read into the called line terminating unit so that the calling and called line terminating units and the illustrated link circuit are all connected to time position 1 on highway 1 for the duration of the call. When negative potential is momentarily applied to conductor RO1, read out transistors 528 and 723 in highway selector 1 and time position store 1 circuit, respectively, are momentarily rendered conductive to apply ground potential through diodes 529 and 724 to conductors HW1 and TPM1, respectively. The read out transistors in the other highway selector and time position store circuits are prevented from becoming conductive since the emitter electrodes of those transistors are returned to a negative potential rather than to ground potential. The highway and time position information is read into the called unit in the exact same manner as previously described for the illustrated link circuit.

The register sender then alternately transmits voice frequency seize and compounded voice frequency digit designation signals over conductors 1SD. During the sending operation, ground potential is applied to the dial inhibit conductor DINH and coupled through diode 527 to render transistor 515 non-conductive. Thus during the sending operation, the calling send gate is closed and the voice frequency seize and dialing signals are transmitted through the called send gate only to highway 1. When the call has been answered in the distant office, the attendant retires from the connection by restoring the seize key in link key circuit 1 without effect on the illustrated circuit.

Assume that a recall signal comprising frequencies U and W, which may be 900 and 1300 c.p.s., respectively, is received from the calling party and applied to the input of multifrequency receiver 908. Multifrequency receiver 908 and all of the other single or multifrequency receivers used in the system may be of any conventional type and are equipped with suitable voice guard circuits so that an output is realized from each receiver only when the particular frequency, or frequencies, to which it is responsive is received. If a recall signal of frequencies U and W is applied to the input of multifrequency receiver 908, ground potential appears on output conductors U and W from receiver 908 and normally conductive transistors 909 and 910 are rendered non-conductive. When both transistors 909 and 910 are rendered non-conductive, the negative potential on the anode of diode 911 permits diode 912 to pass a negative signal to the base of transistor 913 and transistor 913 of the recall flip-flop circuit is rendered conductive. The resulting ground potential appearing at the collector of transistor 913 is applied through isolating diode 915 to the emitter of transistor 916 and transistor 916 is thereafter rendered conductive by each negative pulse appearing on conductor 60 i.p.m. Each time that transistor 916 becomes conductive, normally conductive transistor 917 becomes non-conductive to remove ground potential from conductor LC1 and thus flash a calling supervisory lamp associated with link key circuit 1. When the attendant answers the recall signal, negative potential is applied to conductor QRS1 and the recall flip-flop circuit is reset to the condition wherein transistor 914 is conductive.

Next assume that a release signal comprising frequencies U and V, which may be 900 and 1100 c.p.s., respectively, is receiver from the calling party and applied to the input of multifrequency receiver 908. Under these conditions, ground potential appears on output conductors U and V from receiver 908 and normally conductive transistors 909 and 918 are rendered non-conductive and the calling release flip-flop circuit is triggered to the condition in which transistor 901 is conductive. Ground potential appearing at the collector of conducting transistor 901 is coupled through diode 919 to render transistor 917 non-conductive and ground potential is thereby removed from conductor LC1. Thus, the calling supervisory lamp in link key circuit 1 is steadily illuminated to indicate that the calling party has retired from the connection. Similarly, if a release signal is received from the called party, ground potential is applied to the U and V conductors from receiver 906 and normally conductive transistors 920 and 921 are rendered non-conductive to trigger the called release flip-flop circuit to the condition in which transistor 903 is conductive. When transistor 904 becomes non-conductive, a negative potential is applied to conductor LA1 to illuminate a called supervisory lamp in the link key circuit 1.

If release signals are simultaneously received from the calling and called parties, the link circuit is automatically reset to its idle condition. It can be seen that when transistor 902 of the calling release flip-flop circuit is non-conductive, negative potential is applied to the base of transistor 922, and that when transistor 903 of the called release flip-flop circuit is conductive, ground potential is applied to the base of transistor 923. Transistors 922 and 923 form an "and" gate in which transistor 922 becomes conductive only if negative potential is applied to its base and transistor 923 is conductive. When transistor 922 becomes conductive, ground potential appearing at its collector is applied to the base of transistor 924. Transistors 924 and 925 form a monostable circuit in which transistor 924 is normally conductive and transistor 925 is normally non-conductive. When ground potential is applied to its base by transistor 922, transistor 924 is triggered non-conductive and transistor 925 is triggered conductive. After a period of approximately ten milliseconds, the monostable circuit reverts to its normal condition. The negative pulse appearing at the collector of transistor 924 is coupled over link reset conductor LRS1 to the various flip-flop and flip-flop circuits of the link circuit to restore those circuits to their normal condition. Conductor LRS1 also extends to link key circuit 1 and the negative pulse thereon is utilized to reset that circuit.

The link circuit and the link key circuit may also be restored by the operation of a release key in the link key circuit responsive to the illumination of either the calling or called supervisory lamps. Operation of the link key circuit release key results in the application of ground potential to manual release conductor MR1 to trigger the monostable circuit comprising transistors 924 and 925 and thus reset the circuits as previously described.

The attendant may wish to release the circuits in the forward or called direction only if a wrong number is transmitted or if an all trunks busy condition is encountered. For this purpose, the attendant operates a forward release key at the position circuit to replace the ground potential on conductor FR1 with negative potential. As long as conductor FR1 is held at ground potential, the base of transistor 622 is held at ground potential through diode 621 and the negative pulses in time position 1, which are applied to the calling and called receive gates, have no effect on transistor 621. However, when conductor FR1 is returned to a negative potential, transistor 622 is rendered conductive by each negative pulse and positive pulses in time position 1 appear at the collector of transistor 622 and are applied to conductor LR1'. As explained in the general description, the pluses on conductor LR1' are inverted and amplified and routed to the highway 1 monitor circuit where they are utilized to release the circuits in the forward or called direction.

*Link key circuit 1*

A link key circuit, of the type shown in Figs. 10 and and 11 of the drawings, is provided for each link circuit at each attendant's position. The conductors extending from link circuit 1 to the link key circuits are thus connected in multiple to a link key circuit 1 at each attendant's position. Therefore, it is necessary to inhibit the other positions from handling a particular call when that call is being handled at one of the attendants' positions. The conductors identified as A1, A2, and A3, and shown at the lower right of Fig. 11, are provided for this purpose.

It will be recalled from the description of link circuit 1 that when link circuit 1 is enabled for seizure by the queue store circuit, the incoming lamp individually associated with link circuit 1 is illuminated and ground potential is applied to conductor LKON1. Ground potential applied to conductor LKON1 enables the transistor corresponding to transistor 1101 in the link key circuit corresponding to link circuit 1 at each position for conduction. The call is answered at the illustrated link key circuit by the operation of the link seize key 1102. When seize key 1102 is operated, negative potential is applied to the base of transistor 1101 and transistor 1101 is rendered conductive. The resulting positive-going potential swing at the collector of transistor 1101 is coupled through capacitor 1103 and diode 1104 to trigger the flip-flop circuit comprising transistors 1105 and 1106 to the condition in which transistor 1105 is conductive and transistor 1106 is non-conductive. Ground potential appearing at the collector of conducting transistor 1105 and applied to conductor A1 is coupled through a diode corresponding to either 1107 or 1108 in each of the other link key circuits associated with the link circuit 1, and through a diode corresponding to 1109 to clamp the base of the transistor corresponding to 1101 in each of those link circuits to ground potential so that the operation of the link seize keys in those circuits will have no effect. The ground potential coupled through the diode corresponding to either 1107 or 1108 is also coupled through a diode corresponding to 1110 to clamp the base of the transistor corresponding to 1111 in each of those link key circuits to ground potential so that the operation of the link release keys in those circuits will have no effect. Thus, when the call is answered at one of the positions, the other positions are positively inhibited from exercising any control over that call. The minus twelve volt potential on the swinger of seize key 1102 is connected through back contacts of keys 1102 and 1120 to the swinger of the key corresponding to 1102 at the second position so that simultaneous answer of a particular call by two positions is also positively prevented.

Returning to the consideration of the illustrated link key circuit, it can be seen that when transistor 1101 becomes conductive, normally conductive transistor 1001 is rendered non-conductive and negative potential is thereby applied to conductor QRS1. Negative potential on conductor QRS1 serves to reset the link waiting flip-flop circuit in link circuit 1 and to advance the queue store read out distributor to the next link circuit awaiting attention, as previously described. Also, when transistor 1106 of the link key circuit 1 flip-flop circuit becomes non-conductive and negative potential appears at its collector, the emitter of emitter follower transistor 1112 goes negative and transistor 1113 is rendered conductive. When transistor 1113 becomes conductive, the calling supervisory and called supervisory lamps are illuminated dimly through resistors 1114 and 1115, respectively. The calling and called supervisory lamps serve a dual purpose in the illustrated circuit. As just described, these lamps are illuminated dimly when the link seize key is first operated and remain in that condition for the duration of the call to indicate the busy condition of the associated link circuit. As will be described more fully hereinafter, the calling and called supervisory lamps are brightly illuminated to indicate recall and release operations.

When transistor 1001 becomes non-conductive and negative potential is applied to conductor QRS1, transistors 1002 and 1003 are rendered conductive. Prior to the time that transistor 1003 is rendered conductive, the gating diodes 1004—1009 are all biased in the reverse direction and thus block the transmission of signals over either send conductors 1SD or receive conductors REC.3 since the cathode terminals of the diodes are returned to the plus twelve volt potential at the collector of non-conducting transistor 1003. When transistor 1003 becomes conductive and its collector potential drops to approximately minus six volts, diodes 1004—1009 are biased in the forward direction and signals can then be transmitted between link circuit 1 and the position circuit.

At the end of the keying operation and when the register sender is seized by the register finder, negative potential is applied to read out conductor RO, as explained in the general description. In the illustrated circuit, transistors 1010 and 1011 are rendered conductive and the emitter potential of emitter follower transistor 1012 drops to a negative value when negative potential is applied to conductor RO. The negative potential as the emitter of transistor 1012 is applied to conductor RO1 to control link circuit 1 to read out highway and channel marking information to the bus bars, as previously described. Read out conductor RO is common to all of the link key circuits associated with the attendant's position but the negative potential applied thereto has no effect on the transistor corresponding to 1010 in the link key circuits in which the seize key is not operated since the base of the transistor corresponding to 1010 in those circiuts is clamped to ground potential at the collector of the transistor corresponding to 1001 through a diode corresponding to 1013.

If the attendant desires to release the circuits in the forward or called direction, the forward release key at the position circuit is operated to apply ground potential to conductor LFR, which is connected to all of the link key circuits associated with the position. Transistor 1014 in the illustrated link key circuit is rendered conductive when ground potential is applied to conductor LFR and to its emitter electrode since its base electrode is returned to the negative potential appearing at the collector of non-conducting transistor 1001 and applied to conductor QRS1. The transistor corresponding to 1014 in each of the other link key circuits remains non-conductive because of the conduction of the transistor corresponding to 1001 in each of those circuits. When transistor 1014 becomes conductive, normally conductive transistor 1015 is rendered non-conductive and negative potential is applied to conductor FR1, which extends to link circuit 1. Link circuit 1 is responsive to the receipt of negative potential on conductor FR1 to transmit forward release pulses in the assigned time position to the highway monitor circuit associated with the assigned highway, as previously described. The negative potential appearing at the collector of non-conducting transistor 1015 is also applied through diode 1016 to register release conductor RR for the purpose of restoring the digit register circuits of the register sender to normal.

When the call is answered by the called party, the attendant retires from the connection by restoring the link seize key 1102. When key 1102 is restored, transistor 1001 becomes conductive and ground potential is applied to conductor QRS1 to render transistors 1002 and 1003 non-conductive and effectively disconnect the link circuit associated with the illustrated link key circuit from the position circuit. It is to be noted that the link key circuit flip-flop circuit remains in the condition in which transistor 1105 is conductive so that the calling and called supervisory lamps remain dimly illuminated as an indication that link circuit 1 is busy.

If a recall signal is received by link circuit 1 from the calling party, the ground potential normally appearing on conductor LC1 is interrupted at a 60 i.p.m. rate. Diodes 1116 and 1117 form an "or" gate for positive signals. In non-busy link key circuits, transistor 1106 is conductive and the base of transistor 1118 is clamped to ground potential through diode 1117 regardless of the condition of conductor LC1. In busy link key circuits, transistor 1106 is, of course, non-conductive and the anode terminal of diode 1117 is returned to negative potential. Thus, when ground is removed from conductor LC1, the output of the gate and the emitter of emitter follower transistor 1118 go negative and transistor 1119 is rendered conductive to brightly illuminate the calling supervisory lamp. The attendant operates link seize key 1102 responsive to the flashing of the calling supervisory lamp and link circuit 1 is again effectively connected to the position circuit.

When a release signal is received by link circuit 1 from the calling party, ground potential is removed from conductor LC1 and the calling supervisory lamp is steadily illuminated in the bright condition. Similarly, when a release signal is received by link circuit 1 from the called party, ground potential is removed from conductor LA1, transistor 1123 is rendered conductive, and the called supervisory lamp is illuminated in the bright condition. The attendant operates the link release key 1120 responsive to the steady bright ilumination of either lamp and negative potential is thereby applied to the base of transistor 1111 to render transistor 1111 conductive. When transistor 1111 becomes conductive, ground potential is applied to manual release conductor MR1 for the purpose of releasing link circuit 1. During the process of release, link circuit 1 transmits a negative pulse over conductor LRS1 to link key circuit 1. The negative pulse on conductor LRS1 is coupled through capacitor 1121 and diode 1122 to reset the link key circuit flip-flop circuit to the condition in which transistor 1106 is conductive. When transistor 1106 is conductive, the operation of release key 1120, of course, has no effect on transistor 1111 since the base of transistor 1111 is clamped to ground potential through diode 1124.

*Attendant's position circuit*

The attendant's position circuit is shown in Fig. 12 of the drawings. As shown in the block diagram of Figs. 2B and 2C, conductors REC.3, SD3, and LFR extend from the position circuit to all of the link key circuits associated with the position. As previously explained, any one of the link circuits is individually connected to the position circuit by the operation of the seize key in the link key circuit associated with that link circuit. Speech or any other voice frequency signals received from a calling party by a link circuit are routed through the link key circuit associated with that link circuit and appear on the calling pair of REC.3 conductors. Similarly, speech signals and any other voice frequency signals received from circuits in the called direction by a link circuit are routed through the link key circuit associated with that link circuit and appear on the called pair of REC.3 conductors.

Signals received on the calling pair of REC.3 conductors are amplified by push-pull connected, emitter follower, amplifier transistors 1201 and 1202 and coupled to the attendant's receiver 1203. Signals received on the called pair of REC.3 conductors are amplified by push-pull connected, emitter follower, amplifier transistors 1204 and 1205 and coupled to the attendant's receiver 1203. Signals received on the called pair of REC.3 conductors are also amplified by push-pull connected, emitter follower, amplifier transistors 1206 and 1207 and coupled over conductors REC.4 to a multifrequency receiver in the register sender. The multifrequency receiver in the register sender is designed to detect seize acknowledge, digit acknowledge, and dial tone signals which indicate the progress of a call as fully explained in the above identified copending application.

Talking battery is supplied to the attendant's transmitter 1208 from negative potential normally appearing at the emitter of emitter follower transistor 1209 through choke coil 1210. Speech signals are coupled from transmitter 1208 through capacitor 1211, transformer 1212, and resistor hybrid network 1213 to the push-pull connected, emitter follower transistors 1214 and 1215. The amplified speech signals are coupled to send conductors SD3. Digit designation signals in the form of compound voice frequency signals, and such voice frequency supervisory signals as seize and cancel signals transmitted by the register sender over send conductors SD4, are also coupled through resistor hybrid network 1213 to amplifier transistors 1214 and 1215 and thus to send conductors SD3.

Routing information is keyed into the register sender by the operation of the digit keys corresponding to the digits "1–0" on a one at a time basis. The operation of any one of the digit keys results in the application of minus twelve volt potential to a unique combination of two out of the five conductors KS1–KS5. For example, the operation of digit key 1 results in the application of minus twelve volt potential through diode 1216 to conductor KS1 and through diode 1217 to conductor KS2, while the operation of digit key 2 results in the application of minus twelve volt potential through diode 1218 to conductor KS1 and through diode 1219 to conductor KS3. The end of the keying operation is indicated to the register sender by the application of minus twelve volt potential through diode 1220 to conductor ES when the end of selection key is operated.

Cancellation of registered information before the end of selection key is operated is accomplished by the operation of the cancel key to apply minus twelve volt potential to conductor cancel, which extends to the register sender. If the attendant wishes to release all of the circuits in the forward or called direction after the register sender has started to transmit digit information, the forward release key is operated to apply ground potential to conductor LFR, which extends to the link key circuits.

During the sending operation, negative potential is applied to microphone inhibit conductor MINH by the register sender to render transistor 1221 conductive. When transistor 1221 becomes conductive, ground potential is applied to inhibitor conductor DINH, which extends to the link circuits. It will be recalled from the description of link circuit 1 that ground potential on conductor DINH serves to block the calling send gate in the link circuit so that digit designation and supervisory information is transmitted only in the called or forward direction. Ground potential at the collector of conducting transistor 1221 also renders transistor 1222 non-conductive. The resulting negative potential at the collector of transistor 1222 renders transistor 1223 non-conductive and the resulting positive potential at the collector of transistor 1223 renders transistor 1209 non-conductive to effectively disconnect talking battery from the attendant's transmitter 1208. Talking battery is removed from transmitter 1208 during the sending operation since any background noise introduced at said transmitter might falsely operate the voice guard circuits associated with multifrequency receivers in incoming registers at distance offices and thus prevent the registration of the transmitted digit designation information.

*Queue store circuit*

The queue store circuit, which is shown in Figs. 13 and 14, is provided in the system for the purpose of assuring that calls incoming to the attendant's position, or positions, are answered in the same order in which they are placed. The queue store circuit comprises a plurality of storage positions and each storage position comprises a plurality of storage elements which individually correspond to each attendant's link circuit provided in the system. In the illustrated system, ten storage positions are provided and each storage position comprises twenty-five storage elements individually corresponding to the twenty-five link circuits provided in the illustrated system. Each storage position further comprises a storage position control circuit, such as storage position 1 control circuit for storage position 1, which is utilized to control the twenty-five vertically arranged storage elements, such as storage elements LK1–POS1 through LK25–POS1, in that storage position. Also, a link control circuit, such as link 1 control circuit, is provided in the queue store circuit for each link circuit of the system.

The storage operation of the queue store is controlled by a distributor, namely, distributor 1, which controls the allotment of the storage positions in turn and a distributor, namely, distributor 2, which enables the horizontal rows of storage elements for reading in on a one row at a time basis. Read out of the storage positions in turn is controlled by a read out distributor. Each distributor is designed to stop on and mark a particular position or row of storage elements only if the seize conductor from that position or row of storage elements, respectively, is negative. Mark signals from distributors 1 and 2 are negative-going while mark signals from the read out distributor are positive-going.

To illustrate the operation of the queue store circuit, first assume that no calls are stored in the queue store circuit and that no calls are demanding attention. Under these conditions, the flip-flop circuit in each of the two hundred and fifty storage elements is in the condition in which the transistor corresponding to 1302 is conductive and the transistor corresponding to 1301 is non-conductive. The transistor corresponding to 1303 in each storage position control circuit is, therefore, non-conductive and negative potential is applied to each of the distributor 1 seize conductors D1S1–S1S10, respectively. The negative potential appearing at the collector of each transistor corresponding to 1303 is also coupled through a diode corresponding to 1304 to hold transistor 3401 conductive and thus apply ground potential to the zero or busy position distributor 1 seize conductor D1S0. Since, as previously stated, distributor 1 is designed to stop on and mark a storage position only when the seize conductor from that storage position is negative, distributor 1 stands on one of the storage positions other than the busy position. Assume that distributor 1 stands on the storage position 1 as indicated by the application of negative potential to marking conductor D1M1. Since it was assumed that no calls are awaiting attention, each of the twenty-five link control flip-flop circuits is in the condition in which the transistor corresponding to 1305 is conductive and the transistor corresponding to 1306 is non-conductive. Under these conditions, ground potential is applied to all of the distributor 2 seize conductors D2S1—D2S25 and transistor 1402 is held non-conductive to apply negative potential to the zero or home position distributor 2 seize conductor D2S0. Therefore, distributor 2 stands on the home position when no calls are awaiting attention. If a busy position is not provided for distributor 1 and a home position is not provided for distributor 2, distributors 1 and 2 search until a negative potential is encountered on one of their respective seize conductors. The negative potential applied to marking conductor D1M1 by the first distributor triggers the storage position 1 control flip-flop circuit through diode 1307 to the condition in which transistor 1308 is conductive and transistor 1309 is non-conductive. Therefore, negative potential is applied to read out distributor seize conductor RODS1 and the read out distributor stands on position 1 as indicated by the application of ground potential to conductor RODM1.

Next assume that link circuit 1 is seized by the route selector for the purpose of extending a call to the attendant's position and ground potential appears on demand conductor D1 from link circuit 1. The positive-going potential swing on conductor D1 is coupled through capacitor 1309 and diode 1310 to trigger the link 1 control flip-flop circuit to the condition in which transistor 1306 is conductive and transistor 1305 is non-conductive. The resulting negative potential at the collector of non-conducting transistor 1305 renders transistor 1402 conductive through diode 1311 and ground potential is applied to conductor D2S0 to drive distributor 2 off of the home position. Distributor 2 stops on and marks the first horizontal row of storage elements, which row corresponds to link circuit 1, since seize conductor D2S1 is returned to the negative potential at the collector of transistor 1305. The LK1–POS1 flip-flop circuit is now triggered to the condition in which transistor 1301 is conductive and transistor 1302 is non-conductive since both inputs to the "and" gate for negative signals comprising diodes 1313 and 1314 are negative and the negative output of the gate is coupled through diode 1315 to the base of transistor 1301.

When transistor 1302 becomes non-conductive, the negative potential at its collector is coupled through diode 1316 to render transistor 1303 conductive. The resulting ground potential at the collector of transistor 1303 is applied to conductor D1S1 and serves to advance distributor 1 to the second storage position. The negative potential at the collector of non-conducting transistor 1302 is also coupled through diode 1317 to the base of transistor 1305 and resets the link 1 control flip-flop circuit to the condition in which transistor 1305 is conductive. When the collector of transistor 1305 and seize conductor D2S1 go to ground potential, the second distributor is advanced off of row 1. If no other calls have been placed, distributor 2 advances over conductors D2S2—D2S25, which have ground potential applied thereto, and stops on conductor D2S0, which now stands at negative potential since transistor 1402 becomes non-conductive when transistor 1305 becomes conductive. If, on the other hand, a call had been placed to another link circuit, such as link circuit 25, for example, the second distributor stops when negative potential is encountered on the seize lead, such as D2S25, corresponding to that link circuit. Thus, since the first distributor now stands on storage position 2 and the second distributor applies a marking signal to conductor D2M25, the link 25 storage element in storage position 2 is activated, the first distributor is advanced to the third storage position, and the second distributor then advances to the home position or resumes its searching operation if no home position is provided.

Returning to the consideration of storage position 1, it will be recalled that it was assumed that the read out distributor stands on storage position 1 and is therefore applying ground potential to read out marking conductor RODM1. Transistor 1318 becomes conductive since its emitter is returned to ground potential on conductor RODM1 and its base is returned to negative potential at the collector of non-conducting transistor 1302. When transistor 1318 becomes conductive, ground potential is applied to seize conductor SZ1 to control link circuit 1 to prepare link key circuit 1 for seizure, as previously described. The resulting positive potential swing at the collector of conducting transistor 1318 is also coupled through capacitor 1319 and diode 1320 to trigger the flip-flop circuit comprising transistors 1321 and 1322 to the condition in which transistor 1321 is conductive and transistor 1322 is non-conductive. When transistor 1322 becomes non-conductive, the emitter of emitter follower transistor 1323 goes negative and transistor 1324 is rendered conductive to illuminate lamp incoming 1, which is individually associated with link circuit 1. When the call is answered at the attendant's position responsive to the illumination of lamp INC1, negative potential is applied to conductor QRS1 as described in the description of link key circuit 1. Negative potential on conductor QRS1 serves to reset the flip-flop circuit comprising transistors 1321 and 1322 to the condition wherein transistor 1322 is conductive to thereby extinguish lamp INC1. The negative potential on conductor QRS1 also serves to reset the LK1–POS1 flip-flop circuit to the condition in which transistor 1302 is conductive. When transistor 1301 becomes non-conductive, negative potential is coupled through diode 1325 and capacitor 1326 to trigger the storage position 1 control flip-flop circuit to the condition in which transistor 1309 is conductive. When transistor 1309 becomes conductive, read out seize conductor RODS1 rises to ground potential and the read out distributor is thereby advanced to storage position 2. When transistor 1302 becomes conductive, transistors 1318 and 1303 are rendered non-conductive. When transistor 1303 becomes non-conductive, negative potential is again applied to conductor D1S1 to indicate to distributor 1 that storage position 1 is idle and may be used to store another call after calls have been stored in the remaining storage positions of the queue store circuit.

It may happen that calls are placed in such rapid succession that all of the storage positions are filled. Under these conditions, transistor 1401 becomes non-conductive, negative potential is applied to conductor D1S0 and distributor 1 is thereby controlled to stand on the zero or busy position. Distributor 2 will, of course, be standing on and marking the horizontal row which placed the first call after the ten storage positions became filled. Therefore, it can be seen that the illustrated queue store circuit actually stores eleven calls although just ten storage positions are provided. When storage position 1 is read out and transistor 1303 becomes non-conductive, transistor 1401 is rendered conductive, and distributor 1 is controlled to advance from the busy position to storage position 1 and the operation then continues, as previously described.

*Queue store distributor*

The queue store distributor circuit, which is shown in Fig. 15, represents distributors 1 and 2 and the read out distributor which control the queue store circuit just described. Distributors 1 and 2 are identical and differ from the read out distributor only in that a negative-going potential is applied to the marking conductors by distributors 1 and 2 whereas a positive-going potential is applied to the marking conductors by the read out distributor. Each stage of the distributors 1 and 2 comprises a free running ring counter transistor, such as 1501, a gating transistor, such as 1506, and an inverter transistor, such as 1507, while each stage of the read out distributor comprises just a free running ring counter transistor and a gating transistor. The free running ring counter, which is illustrated as comprising transistors 1501–1505, inclusive, must of necessity comprise an odd number of transistors. Therefore, distributor 1 comprises eleven complete stages since it is designed to control ten storage positions and a busy position, distributor 2 comprises twenty-six complete stages since it is designed to control twenty-five rows of storage elements corresponding to twenty-five link circuits and a zero or home position, and the read out distributor comprises ten complate stages since it is designed to control the read out of ten storage positions. In addition to the above, distributor 2 and the read out distributor must have an extra or twenty-seventh and eleventh transistor, respectively, in the free running ring counter.

To illustrate the operation of the free running ring counter, assume that the base of transistor 1501 has gone negative and transistor 1501 has just begun to conduct. Capacitor 1508 discharges through resistor 1509 to ground potential at the collector of transistor 1501. When capacitor 1508 has discharged, transistor 1502 becomes non-conductive and capacitor 1510 charges toward minus twelve volt potential through resistors 1511 and 1512. When the base of transistor 1503 becomes slightly negative with respect to its emitter, transistor 1503 begins to conduct. When transistor 1503 becomes conductive, transistor 1504 is rendered non-conductive, transistor 1505 is rendered conductive, and transistor 1501 is rendered non-conductive. Thus, it can be seen that as the operation progresses through the chain, the state of conductivity of each transistor is changed from either conductive to non-conductive or from non-conductive to conductive. The speed of operation of the chain is dependent upon the capacitance value of the capacitors, such as 1508 and 1510, and the type of transistors used in the circuit.

In order to derive a useful, progressive, non-overlapping output from the ring counter, a gating transistor is provided at each stage where an output is desired. Each of the gating transistors is connected with its base to the collector of one of the transistors of the ring counter and with its emitter to the collector of an even numbered transistor following said one transistor in the ring counter. The collectors of the two aforementioned ring counter transistors are normally at the same potential, either ground or negative potential. In either case, the gating transistor is non-conductive. On alternate cycles of operation of the ring counter when the potential at the collectors of the aforementioned ring counter transistors is changing from ground to negative potential, the gating transistor is rendered conductive for the short time interval while the collector of said one transistor is at negative potential and the collector of the second transistor is still at ground potential.

To illustrate the above described gating operation, it can be seen that the base electrode of gating transistor 1506 is connected through diode 1511 to the collector electrode of ring counter transistor 1504 and that the emitter electrode of transistor 1506 is connected to the collector of an even numbered, namely, the second, ring counter transistor 1501 following transistor 1504 in the ring counter circuit. If it is assumed that ring counter transistors 1504 and 1501 are conductive and that transistor 1503 has just started to conduct, it can be seen that transistor 1504 becomes non-conductive and negative potential is applied to the anode terminal of diode 1511 in the base circuit of transistor 1506. Diodes 1511 and 1512 form an "and" gate for negative signals and when negative potential is applied to conductor DS1 and the anode terminal of diode 1511 goes negative, a negative output is realized from the gate and gating transistor 1506 is rendered conductive since its emitter is returned to ground potential at the collector of conducting transistor 1501. When transistor 1506 becomes conductive, ground potential is coupled through diode 1513 to the base of ring counter transistor 1505 to prevent transistor 1505 from becoming conductive and the ring counter operation is stopped in the condition in which transistor 1504 is non-conductive and transistor 1501 is conductive to thereby maintain transistor 1506 conductive as long as negative potential is applied to conductor DS1. When gating transistor 1506 becomes conductive, ground potential is also applied to mark conductor DM1 (+) and inverter transistor 1507 is rendered non-conductive to apply negative potential to mark conductor DM1 (−).

When ground potential is applied to conductor DS1 by the controlled circuit, transistor 1506 is rendered non-conductive through diode 1512 and the ring counter continues its stepping operation since ground potential is no longer applied through diode 1513 to the base of ring counter transistor 1505. The ring counter then continues its stepping operation until a seize conductor with negative potential thereon is encountered.

While there has been shown and described what is at present considered to be the preferred embodiment of the invention, modifications thereto will readily occur to those skilled in the art. Therefore, it is not desired that the invention be limited to the embodiment shown and described and it is intended to cover in the appended claims all such modifications as fall within the true spirit and scope of the invention.

What is claimed is:

1. A queue store circuit comprising a plurality of groups of storage elements, a plurality of storage positions each comprising a storage element of each group of storage elements, a seize conductor for each group of storage elements, first and second distributors, means for applying seize signals to said seize conductors in random order, means in said first distributor for transmitting a first mark signal to the storage elements in each storage position on a storage position at a time basis, means for controlling said second distributor to search over said seize conductors in a predetermined order and to terminate its searching operation and transmit a second mark signal to a particular group of elements only when a seize signal is applied to the seize conductor for that group of elements, means associated with each storage element for activating that storage element in response to the simultaneous receipt of a first mark signal and a second mark signal, means responsive to the activation of any one of the storage elements in a storage position for controlling said first distributor to advance to the next succeeding storage position, and means responsive to the activation of any one of the storage elements in a group for terminating the application of a seize signal to the seize conductor for that group to thereby control said second distributor to resume its searching operation.

2. A queue store circuit comprising a plurality of storage elements arranged in rows and columns, a seize conductor for each row of elements, first and second distributors, means for applying seize signals to said seize conductors in random order, means in said first distributor for transmitting a first mark signal to the storage elements in each column on a column at a time basis, means for controlling said second distributor to search over said seize conductors in a predetermined order and to terminate its searching operation and transmit a second mark signal to a particular row of elements only when a seize signal is applied to the seize conductor for that row of elements, means associated with each storage element for activating that storage element in response to the simultaneous receipt of a first mark signal and a second mark signal, means responsive to the activation of any one of the storage elements in a column for controlling said first distributor to advance to the next succeeding column, and means responsive to the activation of any one of the storage elements in a row for terminating the application of a seize signal to the seize conductor for that row to thereby control said second distributor to resume its searching operation.

3. A queue store circuit comprising a plurality of storage elements arranged in rows and columns, an output conductor for each row of storage elements, a first distributor, a second distributor, a read out distributor, means in said first distributor for transmitting a first mark signal to the storage elements in each column on a column at a time basis, means in said second distributor for transmitting a second mark signal to the storage elements in each row on a row at a time basis, means associated with each storage element for activating that storage element responsive to the simultaneous receipt of a first mark signal and a second mark signal, means responsive to the activation of any one of the storage elements in a column for controlling said first distributor to advance to the next succeeding column, means in said read out distributor for transmitting a read out signal to the storage elements in each column on a column at a time basis, and means controlled by the activated storage element in each column and responsive to the receipt of said read out signal for applying an output signal to the output conductor connected to that storage element.

4. A queue store circuit comprising a plurality of storage elements arranged in rows and columns, a seize conductor and an output conductor for each row of elements, a first distributor, a second distributor, a read out distributor, means for applying seize signals to said seize conductors in random order, means in said first distributor for transmitting a first mark signal to the storage elements in each column on a column at a time basis, means for controlling said second distributor to search over said seize conductors in a predetermined order and to terminate its searching operation and transmit a second mark signal to a particular row of elements only when a seize signal is applied to the seize conductor for that row of elements, means associated with each storage element for activating that storage element responsive to the simultaneous receipt of a first mark signal and a second mark signal, means responsive to the activation of any one of the storage elements in a column for controlling said first distributor to advance to the next succeeding column, means responsive to the activation of any one of the storage elements in a row for terminating the application of a seize signal to the seize conductor for that row to thereby control said second distributor to resume its searching operation, means in said read out distributor for transmitting a read out signal to the storage elements in each column on a column at a time basis, and means controlled by the activated storage element in each column and responsive to the receipt of said read out signal for applying an output signal to the output conductor for the row of elements comprising said activated storage element.

5. In combination, a plurality of first circuits adapted to be connected to a common circuit on a one at a time basis, a queue store circuit comprising a plurality of storage positions, each of said storage positions comprising a plurality of storage elements individually corresponding to said first circuits, means for activating the storage element corresponding to a first circuit demanding connection in one of said storage positions with the storage element corresponding to first circuits demanding attention being activated in successive storage positions in the same order that said first circuits demand connection, a read out distributor for transmitting a read out signal to the storage elements in each storage position on a storage position at a time basis, means controlled by the activated storage element in each storage position and responsive to the receipt of said read out signal for enabling the corresponding first circuit for connection, means for connecting a first circuit enabled for connection to said common circuit, and means responsive to the connection of a first circuit to said common circuit for advancing said read out distributor to the next succeeding storage position.

6. In combination, a plurality of first circuits, a common circuit adapted to be connected to said first circuits on a one at a time basis, a queue store circuit comprising a plurality of storage elements arranged in rows and columns with each row of elements individually corresponding to one of said first circuits, a seize conductor for each row of elements, a first distributor, a second distributor, a read out distributor, means for applying a seize signal to the seize conductor for the corresponding row of elements when one of said first circuits is demanding service, means in said first distributor for transmitting a first mark signal to the storage elements in each column on a column at a time basis, means for controlling said second distributor to search over said seize conductors in a predetermined order and to terminate its searching operation and transmit a second mark signal to a particular row of elements only when a seize signal is applied to the seize conductor for that row of elements, means associated with each storage element for activating that storage element in response to the simultaneous receipt of a first mark signal and a second mark signal, means responsive to the activation of any one of the storage elements in a column for controlling said first distributor to advance to the next succeeding column, means responsive to the activation of any one of the storage elements in a row for terminating the application of a seize signal to the seize conductor for that row to thereby control said second distributor to resume its searching operation, means in said read out distributor for transmitting a read out signal to the storage elements in each column on a column at a time basis, means controlled by the activated storage element in each column and responsive to the receipt of said read out signal for enabling the corresponding first circuit for connection to said common circuit, means for connecting said common circuit to first circuits which are enabled for connection, and means responsive to the connection of said common circuit to a first circuit for controlling said read out distributor to advance to the next succeeding column.

7. In combination, a plurality of first circuits adapted to be connected one at a time to a common circuit, a queue store circuit comprising a plurality of storage positions, each of said storage positions comprising a plurality of storage elements individually corresponding to said first circuits, a seize conductor for each of said first circuits, a first distributor, a second distributor, a read out distributor, means for applying a seize signal to the seize conductor corresponding to one of said first circuits when that first circuit is demanding service, means in said first distributor for transmitting a first mark signal to the storage elements in each storage position on a storage position at a time basis, means for controlling said second distributor to search over said seize conductors in a predetermined order and to terminate its searching operation and transmit a second mark signal to all of the storage elements corresponding to one of said first circuits only when a seize signal is applied to the seize conductor for that first circuit, means associated with each storage element for activating that storage element responsive to the simultaneous receipt of a first mark signal and a second mark signal, means responsive to the activation of any one of the storage elements in a storage position for controlling said first distributor to advance to the next succeeding storage position, means responsive to the activation of any one of the storage elements corresponding to a particular first circuit for terminating the application of a seize signal to the seize conductor for that first circuit to thereby control said second distributor to resume its searching operation, means in said read out distributor for transmitting a read out signal to the storage elements in each storage position on a storage position at a time basis, means controlled by the activated storage element in each storage position and responsive to the receipt of a read out signal for enabling the corresponding first circuit for connection to said common circuit, means for connecting said common circuit to first circuits which are enabled for connection, and means responsive to the connection of said common circuit to a first circuit for controlling said read out distributor to advance to the next succeeding storage position.

8. In a telephone system, a plurality of lines, an attendant's position comprising a plurality of link circuits, means for completing individual connections from calling ones of said lines to said link circuits, a queue store circuit at said attendant's position comprising a plurality of storage positions, each of said storage positions comprising a plurality of storage elements individually corresponding to said link circuits, means for activating the storage elements corresponding to link circuits having connections completed thereto in successive storage positions as connections are completed to those link circuits, a read out distributor for transmitting a read out signal to the storage elements in each storage position on a storage position at a time basis, means controlled by the activated storage element in each storage position and responsive to the receipt of said read out signal for enabling the corresponding link circuit for seizure, means at said attendant's position for seizing link circuits enabled for seizure, and means responsive to the seizure of a link circuit for advancing said read out distributor to the next succeeding storage position.

9. In a telephone system, a plurality of lines, an attendant's position comprising a plurality of link circuits, means for completing individual connections from calling ones of said lines to said link circuits, a plurality of incoming signal devices at said attendant's position individually corresponding to said link circuits, means at said attendant's position for performing an answering operation on a link circuit having an activated signal device, a queue store circuit at said attendant's position comprising a plurality of storage positions, each of said storage positions comprising a plurality of storage elements individually corresponding to said link circuits, means for activating the storage elements corresponding to link circuits having connections completed thereto in successive storage positions as connections are completed to those link circuits, a read out distributor for transmitting a read out signal to the storage elements in each storage position on a storage position at a time basis, means controlled by the activated storage element in each storage position and responsive to the receipt of said read out signal for activating the signal device of its corresponding link circuit, and means responsive to the performance of an answering operation on a link circuit for advancing said read out distributor to the next succeeding storage position.

10. In a telephone system, a plurality of lines, an attendant's position comprising a plurality of link circuits, means for extending individual connections from calling ones of said lines to said link circuits, a queue store circuit comprising a plurality of storage positions, each storage position comprising a plurality of storage elements individually corresponding to said link circuits, a seize conductor for each of said link circuits, a first distributor, a second distributor, a read out distributor, means for applying a seize signal to the seize conductor corresponding to one of said link circuits when a connection is extended to that link circuit, means in said first distributor for transmitting a first mark signal to the storage elements in each storage position on a storage position at a time basis, means for controlling said second distributor to search over said seize conductors in a predetermined order and to terminate its searching operation and transmit a second mark signal to all of the storage elements corresponding to one of said link circuits only when a seize signal is applied to the seize conductor for that link circuit, means associated with each storage elements for activating that storage element responsive to the simultaneous receipt of a first mark signal and a second mark signal, means responsive to the activation of any one of the storage elements in a storage position for controlling said first distributor to advance to the next succeeding storage position, means responsive to the activation of any one of the storage elements corresponding to a particular link circuit for terminating the application of a seize signal to the seize conductor for that link circuit to thereby control said second distributor to resume its searching operation, means in said read out distributor for transmitting a read out signal to the storage elements in each storage position on a storage position at a time basis, means controlled by the activated storage element in each storage position and responsive to the receipt of said read out signal for enabling the corresponding link circuit for seizure, means at said attendant's position for seizing link circuits enabled for seizure, and means responsive to the seizure of a link circuit for advancing said read out distributor to the next succeeding storage position.

11. In a telephone system, a plurality of lines, an attendant's position comprising a plurality of link circuits, a plurality of incoming signal devices at said attendant's position individually corresponding to said link circuits, means for extending individual connections from calling ones of said lines to said link circuits, a queue store circuit comprising a plurality of storage positions, each storage position comprising a plurality of storage elements individually corresponding to said link circuits, a seize conductor for each of said link circuits, a first distributor, a second distributor, a read out distributor, means for applying a seize signal to the seize conductor corresponding to one of said link circuits when a connection is extended to that link circuit, means in said first distributor for transmitting a first mark signal to the storage elements in each storage position on a storage position at a time basis, means for controlling said second distributor to search over said seize conductors in a predetermined order and to terminate its searching operation and transmit a second mark signal to all of the storage elements corresponding to one of said link circuits only when a seize signal is applied to the seize conductor for that link circuit, means associated with each storage element for activating that storage element responsive to the simultaneous receipt of a first mark signal and a second mark signal, means responsive to the activation of any one of the storage elements in a storage position for controlling said first distributor to advance to the next succeeding storage position, means responsive to the activation of any one of the storage elements corresponding to a particular link circuit for terminating the application of a seize signal to the seize conductor for that link circuit to thereby control said second distributor to resume its searching operation, means in said read out distributor for transmitting a read out signal to the storage elements in each storage position on a storage position at a time basis, means controlled by the activated storage element in each storage position and responsive to the receipt of said read out signal for activating the signal device of its associated link circuit, means at said attendant's position for performing an answering operation on a link circuit having an activated signal device, and means responsive to the performance of an answering operation on a link circuit for advancing said read out distributor to the next succeeding storage position.

12. In a telephone system of the type in which each calling line is assigned an individual time position which recurs in repetitive time position frames for each call and which time position may be different for each call, an attendant's position comprising a plurality of link circuits, means for assigning the line position assigned to a calling one of said lines to an idle one of said link circuits to thereby complete a connection between said one line and said one link circuit, means at said attendant's position for answering a call from a calling one of said lines to said attendant's position when the link circuit handling that call is enabled for seizure, and means for enabling said link circuits for seizure one at a time in the same sequence that calls are completed between calling ones of said lines and said link circuits.

13. In a telephone system of the type in which each calling line is assigned an individual time position which recurs in repetitive time position frames for each call and which time position may be different for each call, an attendant's position comprising a plurality of link circuits, means for assigning the time position assigned to a calling one of said lines to an idle one of said link circuits to thereby complete a connection between said one line and said one link circuit, a plurality of incoming signal devices at said attendant's position individually corresponding to said link circuits, means at said attendant's position for performing an answering operation on a link circuit having an activated signal device, and means for activating said signal devices one at a time in the same sequence that calls are completed between calling ones of said lines and said link circuits.

14. In a telephone system of the type in which each calling line is assigned an individual time position which recurs in repetitive time position frames for the transmission of communication signals between that line and a common transmission network, an attendant's position comprising a plurality of link circuits, means for individually assigning said link circuits to handle calls from calling lines to said attendant's position, storage means in each link circuit for registering the time position designation of the then associated calling line and for thereafter connecting that link circuit to the transmission network in that time position, means at said attendant's position for answering a call from a calling one of said lines to said attendant's position when the link circuit handling that call is enabled for seizure, and means for enabling said link circuits for seizure one at a time in the same sequence that calls are completed between calling ones of said lines and said link circuits.

15. In a telephone system of the type in which each calling line is assigned an individual time position which recurs in repetitive time position frames for the transmission of communication signals between that line and a common transmission network, an attendant's position comprising a plurality of link circuits, means for individually assigning said link circuits to handle calls from calling lines to said attendant's position, storage means in each link circuit for registering the time position designation of the then associated calling line and for thereafter connecting that link circuit to the transmission network in that time position, a plurality of incoming signal devices at said attendant's position individually corresponding to said link circuits, means at said attendant's position for performing an answering operation on a link circuit having an activated signal device, and means for activating said signal devices one at a time in the same sequence that calls are completed between calling ones of said lines and said link circuits.

16. In a telephone system of the type in which each calling line is assigned an individual time position which recurs in repetitive time position frames for each call and which time position may be different for each call, an attendant's position comprising a plurality of link circuits, means for assigning the time position assigned to a calling one of said lines to an idle one of said link circuits to thereby complete a connection between said one line and said one link circuit, means at said attendant's position for answering a call from a calling one of said lines to said attendant's position when the link circuit handling that call is enabled for seizure, a queue store circuit at said attendant's position, said queue store circuit comprising a plurality of storage positions, each storage position comprising a plurality of storage elements individually corresponding to said link circuits, means for activating the storage elements corresponding to link circuits having connections completed thereto in successive storage positions as connections are completed to those link circuits, a read out distributor for transmitting a read out signal to the storage elements in each storage position on a storage position at a time basis, means controlled by the activated storage elements in each storage position and responsive to the receipt of said read out signal enabling the corresponding link circuit for seizure, and means responsive to the seizure of a link circuit for advancing said read out distributor to the next succeeding storage position.

17. In a telephone system of the type in which each calling line is assigned an individual time position which recurs in repetitive time position frames for each call and which time position may be different for each call, an attendant's position comprising a plurality of link circuits, means for assigning the time position assigned to a calling one of said lines to an idle one of said link circuits to thereby complete a connection between said one line and said one link circuit, a plurality of incoming signal devices at said attendant's position individually corresponding to said link circuits, means at said attendant's position for performing an answering operation on a link circuit having an activated signal device, a queue store circuit at said attendant's position comprising a plurality of storage positions, each of said storage positions comprising a plurality of storage elements individually corresponding to said link circuits, means for activating the storage elements corresponding to link circuits having connections completed thereto in successive storage positions as connections are completed to those link circuits, a read out distributor for transmitting a read out signal to the storage elements in each storage position on a storage position at a time basis, means controlled by the activated storage element in each storage position and responsive to the receipt of said read out signal for activating the signal device of its corresponding link circuit, and means responsive to the performance of an answering operation on a link circuit for advancing said read out distributor to the next succeeding storage position.

18. In a telephone system of the type in which each calling line is assigned an individual time position which recurs in repetitive time position frames for each call and which time position may be different for each call, an attendant's position comprising a plurality of link circuits, means for assigning the time position assigned to a calling one of said lines to an idle one of said link circuits to thereby complete a connection between said one line and said one link circuit, a queue store circuit comprising a plurality of storage positions, each storage position comprising a plurality of storage elements individually corresponding to said link circuits, a seize conductor for each of said link circuits, a first distributor, a second distributor, a read out distributor, means for applying a seize signal to the seize conductor corresponding to one of said link circuits when a connection is completed to that link circuit, means in said first distributor for transmitting a first mark signal to the storage elements in each storage position on a storage position at a time basis, means for controlling said second distributor to search over said seize conductors in a predetermined order and to terminate its searching operation and transmit a second mark signal to all of the storage elements corresponding to one of said link circuits only when a seize signal is applied to the seize conductor for that link circuit, means associated with each storage element for activating that storage element responsive to the simultaneous receipt of a first mark signal and a second mark signal, means responsive to the activation of any one of the storage elements in a storage position for controlling said first distributor to advance to the next succeeding storage position, means responsive to the activation of any one of the storage elements corresponding to a particular link circuit for terminating the application of a seize signal to the seize conductor for that link circuit to thereby control said second distributor to resume its searching operation, means in said read out distributor for transmitting a read out signal to the storage elements in each storage position on a storage position at a time basis, means controlled by the activated storage element in each storage position and responsive to the receipt of said read out signal for enabling the corresponding link circuit for seizure, means at said attendant's position for seizing link circuits enabled for seizure, and means responsive to the seizure of a link circuit for advancing said read out distributor to the next succeeding storage position.

No references cited.

UNITED STATES PATENT OFFICE

CERTIFICATE OF CORRECTION

Patent No. 2,923,777 February 2, 1960

Gerhard O. K. Schneider

It is hereby certified that error appears in the printed specification of the above numbered patent requiring correction and that the said Letters Patent should read as corrected below.

Column 4, line 22, for "lines of" read -- lines or --; column 5, line 11, before "trunk" insert -- the --; column 12, line 6, for "flip-flop" read -- flip-flip --; column 16, line 43, for "receiver" read -- received --; column 17, line 13, for "flip-flop, second occurrence, read -- flip-flip --; column 18, line 70, for "as the" read -- at the --; column 24, lines 31 and 32, for "complate" read -- complete --; column 29, lines 17 and 18, and column 31, line 25, for "elements", each occurrence, read -- element --.

Signed and sealed this 9th day of August 1960.

(SEAL)
Attest:

KARL H. AXLINE
Attesting Officer

ROBERT C. WATSON
Commissioner of Patents